(12) United States Patent
Stumpe et al.

(10) Patent No.: US 12,271,832 B2
(45) Date of Patent: Apr. 8, 2025

(54) ARTIFICIAL INTELLIGENCE ENGINE FOR DIRECTED HYPOTHESIS GENERATION AND RANKING

(71) Applicant: Tempus AI, Inc., Chicago, IL (US)

(72) Inventors: Martin Stumpe, Chicago, IL (US); Alena Harley, Chicago, IL (US)

(73) Assignee: Tempus AI, Inc., Chicago, IL (US)

( * ) Notice: Subject to any disclaimer, the term of this patent is extended or adjusted under 35 U.S.C. 154(b) by 111 days.

(21) Appl. No.: 17/651,002

(22) Filed: Feb. 14, 2022

(65) Prior Publication Data

US 2022/0261668 A1 Aug. 18, 2022

Related U.S. Application Data

(60) Provisional application No. 63/149,093, filed on Feb. 12, 2021.

(51) Int. Cl.
| | |
|---|---|
| *G06F 7/02* | (2006.01) |
| *G06F 16/00* | (2019.01) |
| *G06F 16/2457* | (2019.01) |
| *G06F 16/28* | (2019.01) |
| *G06N 3/045* | (2023.01) |
| *G06N 5/02* | (2023.01) |
| *G06N 5/04* | (2023.01) |

(52) U.S. Cl.
CPC ....... *G06N 5/041* (2013.01); *G06F 16/24578* (2019.01); *G06F 16/284* (2019.01); *G06N 3/045* (2023.01); *G06N 5/02* (2013.01)

(58) Field of Classification Search
CPC .......... G06N 5/041; G06N 3/045; G06N 5/02; G06F 16/24578; G06F 16/284
See application file for complete search history.

(56) References Cited

U.S. PATENT DOCUMENTS

| 10,450,611 | B2* | 10/2019 | West | G16B 20/10 |
|---|---|---|---|---|
| 10,861,583 | B2* | 12/2020 | Jessen | G16B 5/00 |
| 10,885,150 | B2* | 1/2021 | De La Torre | G16H 50/30 |
| 2009/0181371 | A1* | 7/2009 | Samowitz | C12Q 1/6886 |
| | | | | 435/6.14 |

(Continued)

*Primary Examiner* — Bruce M Moser
(74) *Attorney, Agent, or Firm* — Quarles & Brady LLP

(57) ABSTRACT

An artificial intelligence engine for directed hypothesis generation and ranking uses multiple heterogeneous knowledge graphs integrating disease-specific multi-omic data specific to a patient or cohort of patients. The engine also uses a knowledge graph representation of 'what the world knows' in the relevant bio-medical subspace. The engine applies a hypothesis generation module, a semantic search analysis component to allow fast acquiring and construction of cohorts, as well as aggregating, summarizing, visualizing and returning ranked multi-omic alterations in terms of clinical actionability and degree of surprise for individual samples and cohorts. The engine also applies a moderator module that ranks and filters hypotheses, where the most promising hypothesis can be presented to domain experts (e.g., physicians, oncologists, pathologists, radiologists and researchers) for feedback. The engine also uses a continuous integration module that iteratively refines and updates entities and relationships and their representations to yield higher quality of hypothesis generation over time.

30 Claims, 8 Drawing Sheets

(56) References Cited

U.S. PATENT DOCUMENTS

| | | | |
|---|---|---|---|
| 2012/0158633 A1* | 6/2012 | Eder | G16H 50/50 |
| | | | 707/E17.014 |
| 2015/0363559 A1* | 12/2015 | Jackson | G16B 20/20 |
| | | | 705/2 |
| 2017/0299594 A1* | 10/2017 | Depinho | C12N 15/8509 |
| 2018/0068083 A1* | 3/2018 | Cohen | G16B 40/00 |
| 2019/0079938 A1* | 3/2019 | Agrawal | G06F 16/358 |
| 2019/0130290 A1* | 5/2019 | Kerber | G06N 5/022 |
| 2019/0197431 A1* | 6/2019 | Gopalakrishnan | G06N 20/00 |
| 2020/0176098 A1 | 6/2020 | Lucas et al. | |
| 2020/0381087 A1 | 12/2020 | Ozeran et al. | |
| 2021/0319907 A1* | 10/2021 | Harley | G16H 50/70 |
| 2022/0154295 A1* | 5/2022 | Velculescu | A61K 39/3955 |

* cited by examiner

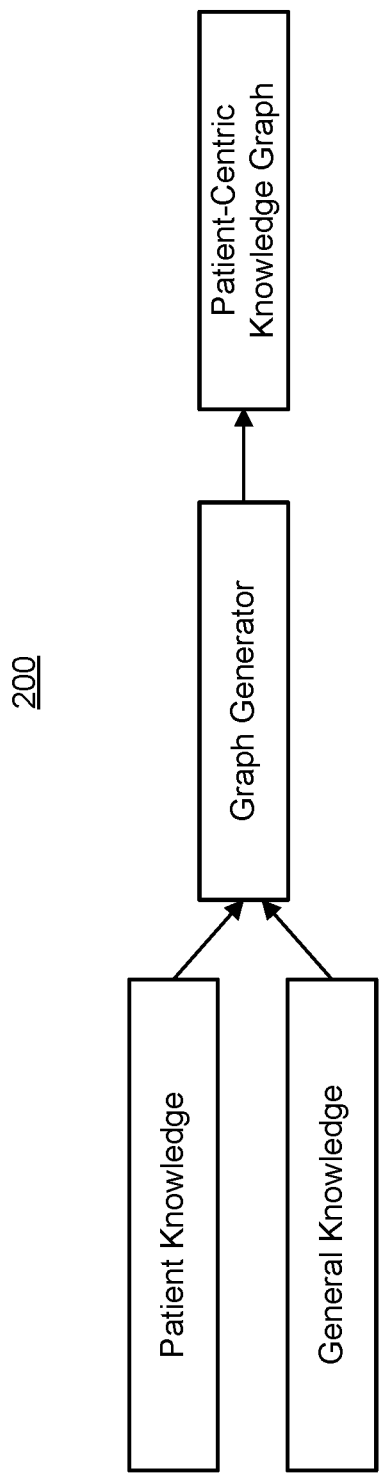

ARTIFICIAL INTELLIGENCE ENGINE FOR DIRECTED HYPOTHESIS GENERATION AND RANKING

CROSS-REFERENCE TO RELATED APPLICATIONS

This application claims the benefit of priority to U.S. provisional application 63/149,093, filed Feb. 12, 2021.

BACKGROUND OF THE INVENTION

Accelerated discovery in the precision medicine setting is something of a Holy Grail in healthcare, it aims to integrate all available knowledge, and deliver personalized treatments to individual patients utilizing all of the available data at the point of care. Despite recent developments, there exists an unmet need in the biomedical market space for a platform that enables accelerated discovery of actionable knowledge.

It is widely recognized that the undiscovered public knowledge is the unintended consequence of specialization and the relationship between different pieces of published evidence is often neglected. For example, as of 2020, PubMed comprises more than 30 million biomedical articles. The compounding aspect of the problem of scientific discovery is that there is "a greater-than-exponential" rise in the new types of -omics data sequenced (transcriptomics, chromatin accessibility, epigenetics, microbiomes, proteomics, metabolomics, single-cell datasets), information in electronic medical records, and imaging. Some of the prominent public multi-omic data initiatives include the Cancer Genome Atlas (TCGA), International Cancer Genome Consortium (ICGC), The Therapeutically Applicable Research to Generate Effective Treatments (TARGET), NCI-60, and CCLE. In addition, the scientific community in the biomedical field has produced a wealth of structured tabular annotation data: FDA labels, NCCN guidelines, clinical trials, cBioPortal, CIViC, OncoKB, COSMIC, DrugBank, ClinVar, HGMD, PGMD, UniProt, PharmGKB, dbSNP, dbNSFP, 1000Genomes, EXAC, GeneOntology, KEGG, Reactome, RxNorm, UMLs, Snomed CT, HPO, NCCN Drug and Biologics Compendium, Thomson Micromedex DrugDex, Elsevier Gold Standard's Clinical Pharmacology compendium, American Hospital Formulary Serving-Drug Information Compendium, ESMO guidelines, ASCO guidelines, CAP guidelines and many others. Some of these require licensing for commercial use.

Furthermore, patient records exist in numerous formats ranging from physical papers sitting in folders on a shelf at a physician's office to electronic health/medical records to even structured formats residing in a database of patient information. These patient records may be associated with multitudes of identified, structured components unique to the recording system that stores the data. Searching these individual recording systems, including those that are mere physical storage solutions, requires substantial initial preparation to tie the information in each storage solution to a commonly referenceable structured format. In addition, once converted to the commonly referenceable structured format, the number of features present in the patient data may extend into the tens or hundreds of thousands of features.

In the context of knowledge discovery, and more specifically the process of new promising computational hypothesis generation, traditional correlation analysis of structured data exponentially increases in complexity with the number of features analyzed. For example, for a feature set having N features, a one-to-one correlation matrix requires $N \times N-1$ correlation calculations and a multivariate correlation set of matrices requires N! correlation calculations. Performing billions or trillions of correlation calculations is prohibitive in means of computing resources and time required. What is needed is a more targeted generation process and/or filtering mechanism for directing the correlation discovery process to reduce the number of computations to include those which are most likely to reveal promising correlations. Even with a substantial reduction in the correlation discovery process, the number of correlations may extend well beyond the number which a team of correlation experts may review for biomarker discovery within their lifetimes. Some correlations that may be identified may hold obvious correlations which are not indicative of biomarkers. For example, a biomarker may be identified based on the correlation matrix or multivariate correlation matrices which links the incidence of patient gender, male, with the occurrence of prostate cancer. Additionally, a biomarker may be identified that patients who have sequencing results from a tumor sequencing laboratory, have been diagnosed with cancer. In yet another example, patients which have been diagnosed with depression may be prescribed a class of medications that act as serotonin inhibitors. Such biomarkers may be recognized as known relationships which are not indicative of biomarkers, despite the high level of correlation in the respective patient features. What is needed is a directed generation process, filtering and ranking system and mechanism for prioritizing meaningful, undocumented biomarkers over spurious correlations which are already accepted in the field or containing relationships which are not meaningful as biomarkers for research, treatment, or other applications to particular diseases.

The most common way to represent structured data and its inter-dependencies in a compact way is a knowledge graph that captures link existence between entities. Recently a large number of knowledge graphs, such as Freebase, DBpedia, YAGO, and NELL, have been created and successfully applied to many real-world applications, from semantic parsing, and named entity disambiguation, to information extraction and question answering. Prominent industries using enterprise knowledge graphs include Web search (e.g., Google, Bing), commerce (e.g., Airbnb, Amazon, eBay, Uber, Diffbot), social networks (e.g., LinkedIn, Facebook), and others integrating, managing and extracting value from diverse sources of data at large scale. There has also been a lot of interest in the bio-pharmaceutical space to build Knowledge graph-based systems to address the integration and reasoning problems, e.g. IBM (IBM Watson, IBM for Oncology), Elsevier, AstraZeneca, Novartis, Benevolent AI, and HetioNet.

Despite these developments, the discovery processes in many industries is manual, slow, expensive, and ad hoc, and there currently are no automated/semi-automated iterative discovery systems available in the biomedical space. As a result, the knowledge discovery process is not industrialized, so that research scientists are very often faced with the challenge of integrating data across many knowledge modalities, dealing with the internal data that is siloed, and struggling to sample the space of efficient hypotheses effectively. Under-utilization of available data and the relatively slow pace of discovery highlights an urgent need to accelerate actionable discovery for many diseases. Particularly, in drug discovery, it takes on average 10-15 years to develop one drug, and costs hundreds of millions of dollars per drug. The attrition rate of drug development today is over 90%.

The present disclosure relates to directed hypothesis generation and ranking discovery. In one aspect, the systems and methods comprise an engine for hypothesis discovery of biomarkers and disease states from patient records. In yet another aspect, the systems and methods comprise an engine for hypothesis discovery of drug related knowledge including identifying candidate targets, drug repositioning (e.g. repurposing of abandoned drugs), adverse drug reaction prediction, discovery of features indicative of treatment response or adverse events, optimizing lines of therapy, polypharmacy predictions, drug combinations, or off-label drug use. In this disclosure we will primarily focus on identification and characterization of biomarkers that are essential for targeted drug development as an illustrative non-limiting example. However, this disclosure can address other hypothesis generation problems in the biomedical space.

Precision medicine utilizes identified biomarkers to inform treatments specific to that patient's disease state. Biomarkers can be any alteration that is linked to a group of patients. They can be mutations in DNA, RNA, fusion genes, copy number changes, H&E features, or any other alteration that is only found in defined disease states. In cancer, biomarkers may be intrinsic or acquired due to therapeutic agents (usually resistance mutations). Some diagnostic, predictive, or prognostic biomarker examples include a KRAS G12 mutation in colorectal cancer that predicts resistance to cetuximab, while high ESR1 expression in breast cancer is prognostic for recurrence. Biomarker discovery utilizes cohort analytics. The most essential variables are sample size and sample selection. Two cohorts are required to determine if the biomarker is unique. Examples include treated or not-treated tumors, Her2 positive or negative breast cancer, resistant or responder tumors, short vs long progression free survival or other relevant end point of interest. Standard ways to identify biomarkers (especially compound bio-markers) involve: cohort stratification and profiling. Particularly, associating prognostic, diagnostic and therapeutic information to all the available data (e.g., genomic, transcriptomic, proteomic, functional, medical, imaging, literature) to stratify cohorts of patients on a potential multi-omic prognostic, diagnostic, adverse effect or therapeutic biomarker(s). This process is manual, lengthy, variable in terms of methods and generally does not scale.

The key areas of knowledge exploration for cohort stratification and profiling we are addressing in this disclosure is the new hypothesis generation mechanisms that utilizes: (1) graph theoretical analysis; (2) knowledge graph embeddings; (3) multi-modal data analysis (e.g. clustering, visualization, semantic search); and (4) alignment and difference between: "what is known in my data" vs "what is known in the world" knowledge graphs.

The platform, systems, media, and methods described herein, in some embodiments, treats the scientific discovery process as an iterative loop between hypothesis generation, experimentation, and data interpretation. Data interpretation includes putting new findings into the context of relevant knowledge. The key steps of knowledge exploration we are well positioned to explore are: (1) cohort stratification and profiling: effectively associating prognostic, diagnostic and therapeutic information to all the available data (e.g., genomic, transcriptomic, proteomic, functional, medical, imaging, literature) to stratify cohorts of patients on a potential multi-omic prognostic, diagnostic, adverse effect or therapeutic biomarker(s); (2) disease state understanding: integrating multi-omic data sets and literature to form a complete picture of disease (cancer) biology, determining key regulatory events relevant to disease e.g. pathway reconstruction, prediction of causality; (3) drug related hypothesis generation: reason and generate new promising hypothesis in drug biomedical space, e.g. optimization of line of treatment, identifying candidate targets and compounds, drug repositioning, adverse effect prediction, polypharmacy predictions. The system tests associations, generates hypotheses, quantifies "surprise" relative to existing knowledge and outputs a ranked list of hypotheses that can be further refined by the human expert in the loop.

SUMMARY OF THE INVENTION

In accordance with various embodiments, the platform, systems, media, and methods described herein, including an artificial intelligence engine for directed hypothesis generation and ranking described herein, can comprise of any combination of the following components: (1) a heterogeneous knowledge graph integrating multi-omic data (genomic, transcriptomic, molecular, imaging, clinical, electronic health records); (2) a background knowledge graph representing 'what the world knows' in the relevant biomedical subspace (e.g. literature, clinical trials, real world evidence, patents, external molecular datasets); (3) an information retrieval and semantic search component that allows fast querying and construction of cohorts for hypothesis generation, makes the integrated data searchable, and acts as a universal relation finder and reducer and allows domain experts to interact with the data; (4) a hypothesis generation module that provides association between multi-omic data and clinical findings; (5) a moderator module that ranks and filters hypotheses, and surfaces the most promising hypothesis to the domain experts (e.g. physicians, oncologists, pathologists, radiologists and researchers); and (6) a continuous integration module that iteratively refines and updates entities and relationships and their representations to yield a higher quality of hypothesis over time.

In accordance with various embodiments, a method is provided for converting clinico-multi-omic patient and cohort data into heterogeneous knowledge graph(s) integrating multi-omic data, wherein each of a plurality of triplets (or quadruples) comprises disease-specific data specific to a patient or a cohort of patients, e.g., (head-entity, relationship, tail-entity, [time-stamp]). The method can further comprise ingesting additional multi-omic data and annotations associated with the additional multi-omic data, the additional multi-omic data related to one or more entities or relationships in the graph. In one aspect, multi-omic genomic and clinical information is triplified into (head, relationship, tail) or (subject, predicate, object). In another aspect, multi-omic genomic and clinical information is quadruple-ified into (head, relationship, tail, time-stamp) or (subject, predicate, object, time-stamp). In another aspect, a temporal sequence of genetic alterations within subtypes and/or a temporal sequence of events relevant to the treatment and disease progression (e.g. diagnostic window, surgery, chemotherapy, progression free interval, relapse, change of line of therapy, non-progression, etc.) is represented by a temporal knowledge graph.

In accordance with various embodiments, a proposed method is provided for ingressing domain-specific entities into a domain specific knowledge-graph, e.g. genomic (single nucleotide variations, indels in tumor and normal, structural rearrangements, copy number variations, gene fusions), transcriptomic, medical literature data (publications, treatment guidelines, clinical trials inclusion/exclusion criteria), phenotypic data (functional, clinical, electronic medical records, histopathology and radiology reports), imaging data (histopathology slides, Mill scans, X-rays, mammograms, ultrasounds, PET images, CT scans), cancer annotation sources (variants, genes, pathways, drugs), derived cancer analytics (tumor mutation burden, mutational signatures, microsatellite instability status, differentially expressed genes, spatial omics lineage representations, neo-antigen binding affinities for MEW class I and class II molecule). The method can further comprise normalizing domain entities using domain specific ontologies that provide dictionaries and normalization processes (for e.g. Disease ontology, Functional class, Gene ontology, and others).

Additional aspects will be evident from the detailed description that follows, as well as the claims appended hereto and the drawings.

BRIEF DESCRIPTION OF THE DRAWINGS

The foregoing illustrative examples of various aspects and implementations provide an overview or framework for understanding the nature and character of the claimed aspects and implementations. It should be understood that each figure depicts exemplary aspects of the present system and methods for illustrative purposes to aid in the disclosure of the systems and methods and are not intended to limit the disclosure accordingly.

FIG. 3 is an illustration of an exemplary system 200 for patient-centric knowledge graph schema.

DETAILED DESCRIPTION OF THE INVENTION

Figure 1:
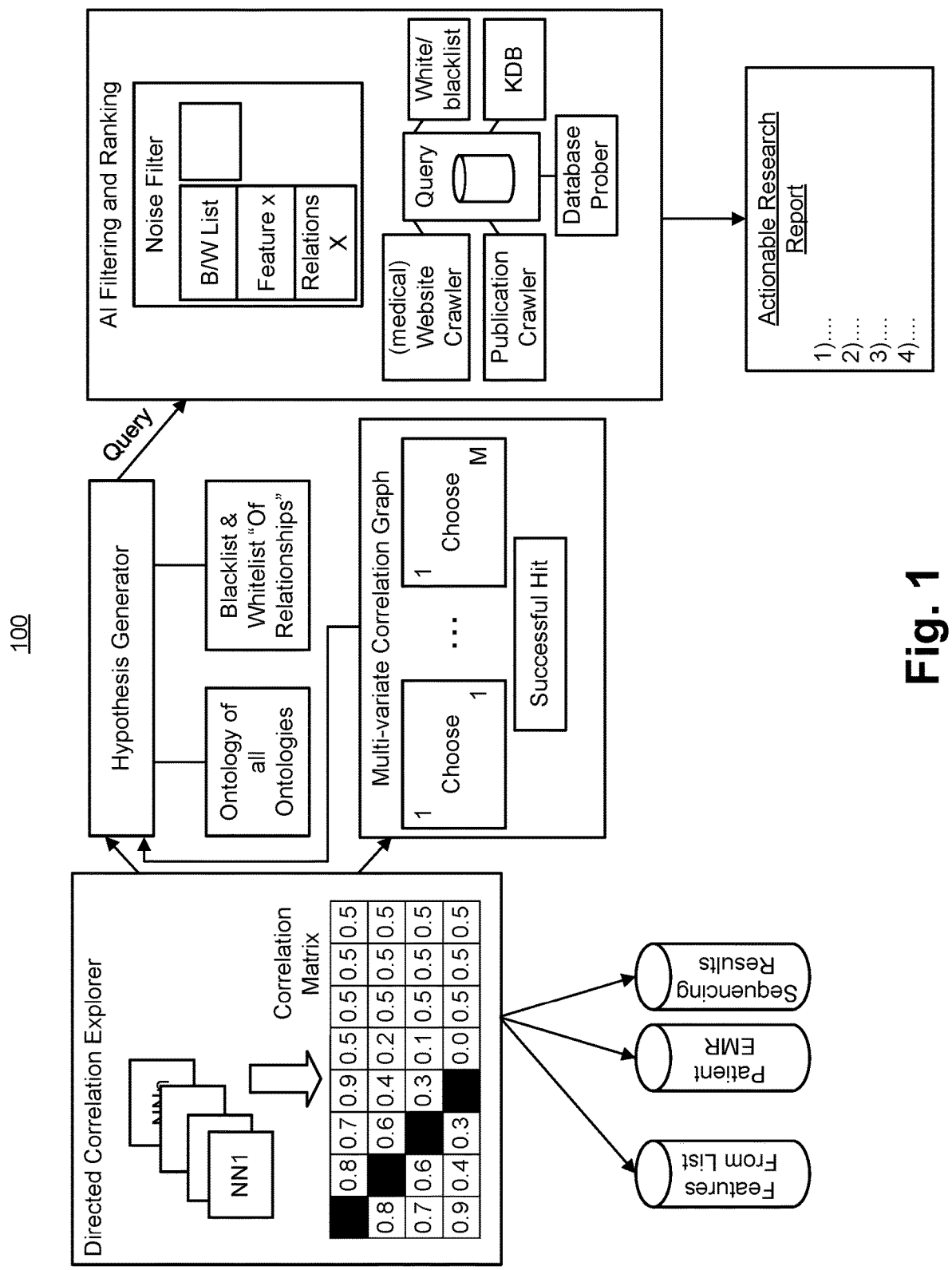
FIG. 1 illustrates an example of a system 100 architecture for the artificial intelligence engine for directed hypothesis generation and ranking in accordance with various embodiments.

This specification describes various exemplary embodiments of an artificial intelligence engine for directed hypothesis generation and ranking, and systems and methods associated therewith. The disclosure, however, is not limited to these exemplary embodiments and applications or to the manner in which the exemplary embodiments and applications operate or are described herein.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Unless otherwise defined, scientific and technical terms used in connection with the present teachings described herein shall have the meanings that are commonly understood by those of ordinary skill in the art. Further, unless otherwise required by context, singular terms shall include pluralities and plural terms shall include the singular. Generally, nomenclatures utilized in connection with, and techniques of, cell and tissue culture, molecular biology, and protein and oligo- or polynucleotide chemistry and hybridization described herein are those well-known and commonly used in the art. Standard techniques are used, for example, for nucleic acid purification and preparation, chemical analysis, recombinant nucleic acid, and oligonucleotide synthesis. Enzymatic reactions and purification techniques are performed according to manufacturer's specifications or as commonly accomplished in the art or as described herein. The techniques and procedures described herein are generally performed according to conventional methods well known in the art and as described in various general and more specific references that are cited and discussed throughout the instant specification. See, e.g., Sambrook et al., Molecular Cloning: A Laboratory Manual (Third ed., Cold Spring Harbor Laboratory Press, Cold Spring Harbor, N.Y. 2000). The nomenclatures utilized in connection with, and the laboratory procedures and techniques described herein are those well-known and commonly used in the art.

As used herein, the term "biomarkers" refers to objectively measurable indicators of biological states.

As used herein, the term "knowledge representational learning" and "graph representational learning" refers to learning the distributed representations of both entities and relations of a knowledge graph, and projecting their distributed representations into a low-dimensional semantic space.

As used herein, the term "link prediction" in the context of knowledge graph refers to inferring connections between entities based on relationships already found to exist between other entities in the network.

As used herein, the term "entity classification" in the context of a knowledge graph refers to inferring properties of an entity based on similar entities utilizing learned knowledge graph representation.

As used herein, the term "graph classification" in the context of a knowledge graph refers to inferring properties of a graph based on similar graph structure utilizing learned knowledge graph representation.

As used herein, the term "semantic search" refers to search with meaning, as distinguished from lexical search where the search engine looks for literal matches of the query words or variants of them, without understanding the overall meaning of the query.

As used herein, the term "FDA" is an acronym that stands for the US Food and Drug Administration.

As used herein, the term "NCCN" is an acronym that stands for the National Comprehensive Cancer Network.

As used herein, the term "COSMIC" is an acronym that stands for the Catalogue of Somatic Mutations in Cancer.

As used herein, the term "TCGA" is an acronym that stands for the Cancer Genome Atlas.

As used herein, the term "ICGC" is an acronym that stands for International Cancer Genome Consortium.

As used herein, the term "GENIE" is an acronym that stands for the American Association for Cancer Research launched project Genomics Evidence Neoplasia Information Exchange.

As used herein, the term "CIViC" is an acronym that stands for Clinical Interpretation of Variants in Cancer.

As used herein, the term "GWAS" is an acronym that stands for Genome-Wide Association Studies.

EMBODIMENTS

General Architecture

I. Heterogeneous Knowledge Graph Integrating Multi-Omic Data

Figure 2A:
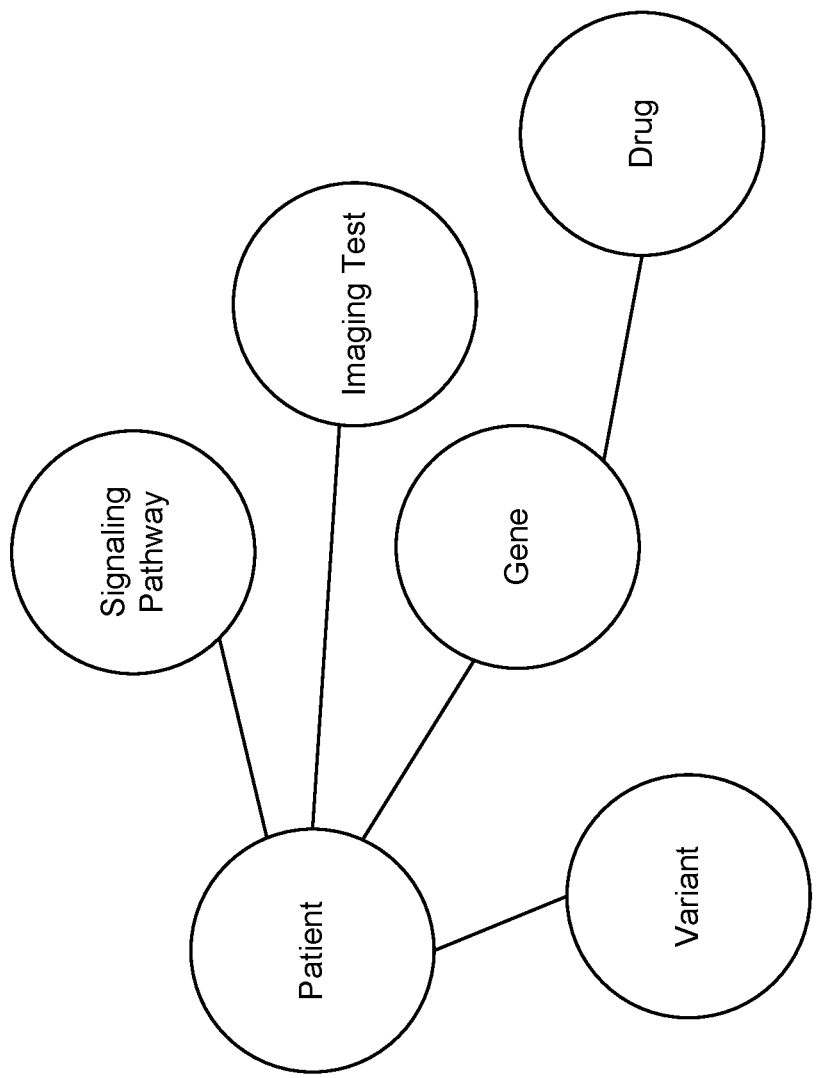
FIG. 2A illustrates an example of a multi-omic knowledge graph, in accordance with various embodiments.

In accordance with various embodiments, the proposed method is provided for ingressing domain-specific entities into a domain specific knowledge-graph. Furthermore, the proposed method constructs a directed labeled multi-relational patient-centric knowledge graph/knowledge base that represents semantics of the domain. FIG. 2A illustrates an exemplary multi-omic knowledge graph. Entities are identified via dictionaries (e.g. existing domain ontologies for clinico-genomic entities) and further normalization may be performed. Each entity refers to a unique object in the physical world (e.g. patient, gene, variant, signaling pathway, drug, therapy, outcome, imaging test [pathology findings, radiology findings, histogenomic findings], genomic test, etc.). Non-limiting examples of genomic data are single nucleotide variations, indels in tumor and normal, structural rearrangements, copy number variants, gene fusions, transcriptomic information (differentially expressed genes, RNA-confirmed variants, transcript and gene expression counts). Non-limiting examples of triplets/quadruplets in the heterogeneous knowledge graph are (patient, has, disease), (patient, has-mutation-in, pathway), (patient, has-mutation-in, gene), (patient, has, mutation), (patient, took, line-of-therapy, time-window), (patient, has, outcome, time-stamp), (patient, belongs-to, cohort).

Figure 2B:
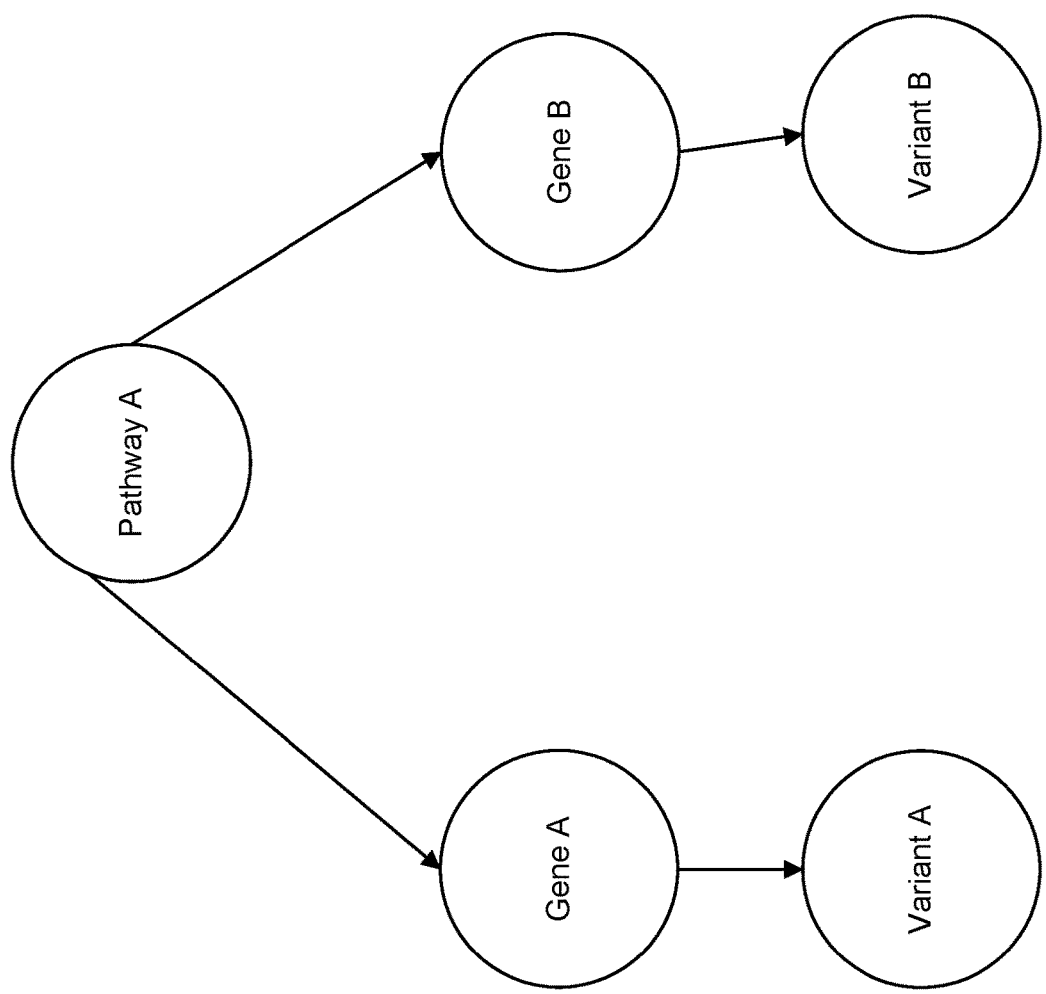
FIG. 2B illustrates an example of a hierarchical propagation of annotations and ranking of variants, in accordance with various embodiments.

FIG. 2B illustrates an example of a hierarchical propagation of annotations and ranking of variants according to some embodiments. FIG. 3 illustrates an exemplary system 200 for patient-centric knowledge graph schema.

In one embodiment, the domain-specific knowledge-graph is a temporal knowledge graph that incorporates temporal information e.g. (start_date, finish_date), duration, and date. In this case temporal embedding is derived, and entity dynamics, temporal relational dependency, and temporal logical reasoning can be performed.

In accordance with various embodiments, a proposed method uses unsupervised and self-supervised machine learning methods (e.g. Autoencoders, Variational Autoencoders, Sparse Vector Analysis, Principal Component Analysis, Independent Component Analysis, Tensor Factorization) on multi-modal (genomic, transcriptomic, clinical) patient-level and cohort data to stratify cohorts on a potential biomarker and represent these findings in the heterogeneous knowledge graph e.g. in the form of (biomarker, stratifies, cohort), (biomarker, affects-overall-survival, drug-treated-cohort), (clinical-variable, responsible-for, super-response), (drug, has, side-effect), (disease, presents, symptom), (disease, resembles, disease), (disease, localizes, anatomy), (drug, treats, disease), (drug, binds, gene), (drug, resembles, drug), (drug, upregulates, gene), (drug, downregulates, gene), (gene, participates-in, biological-process), (gene, regulates, gene), (gene, participates-in, pathway), (gene, interacts-with, gene).

In accordance with various embodiments, in a proposed method, a domain concept can be further refined using domain experts. Validation of the knowledge graph is done by assessing overall accuracy of the representation on a specific biomedical sub-domain.

In accordance with various embodiments, a proposed method catalogues the data sources including annotations from various relevant biological databases (e.g. COSMIC, ClinVar, NCCN guidelines, FDA labels, CIViC) and medical literature data (publications, treatment guidelines) and indexes this data into the patient-centric knowledge graph to densify relationships between entities. In one embodiment, this additional information densifies connections between domain entities reflecting how entities affect each other in specific settings.

II. Background Bio-Medical Knowledge Graph

In accordance with various embodiments, the proposed method includes a continuously updated background bio-medical knowledge graph that represents 'what the world knows' in the relevant bio-medical subspace. Non-limiting examples of the sources of information include linking data of variable quality from the literature, clinical trials, real world evidence, patents, analysis derived from external and internal molecular datasets. In one embodiment, this knowledge graph is constructed by using joined entity and relationship extraction from text and normalization of entities and relations from structured annotation data sources. In another embodiment, the knowledge graph is constructed by using a joint learning framework with mutual attention for data fusion between knowledge graph(s) and text. In one other embodiment, the knowledge graph is constructed by using distant or weak supervision, open information extraction, or by utilizing transfer learning (e.g. language models trained on the related text corpus). Non-limiting examples of triplets/quadruplets in the heterogeneous knowledge graph are (disease, caused-by-mutation-in, gene), (disease, caused-by-mutation-in, pathway), (gene, is-part-of pathway), (gene-mutation, associated-with, disease), (gene-mutation, causes, disease), (protein, binds-to, protein). The patterns of interest are extracted from scientific literature, guidelines, patents, domain-specific knowledge bases and data analyses from clinico-genomic data sets and large-scale EHR data sets.

In one embodiment, the large-scale background bio-medical knowledge graph enables verification of hypothesis, matching against what is known, commonsense reasoning, and tracking knowledge acquisition in the system. It can further be used for entity recognition, entity alignment, relationship extraction, triple/quadruple classification, relation classification, hypothesis generation, and other tasks. In another embodiment, the background bio-medical knowledge graph is used to classify generated hypotheses into a number of classes, e.g., trivial relation (e.g., breast cancer occurs in breast), known fact with a specific degree of evidence (e.g., HER2+ breast cancer responds to Herceptin), unconfirmed knowledge or potential facts previously unknown that need validation (e.g., triple negative breast cancer [TNBC] might respond to off-label prostate cancer drug), spurious correlation and batch effect (e.g., lung cancer is correlated with specific clinical partner), false statements or statements that have contradictory evidence (e.g., hydroxychloroquine has efficacy against COVID19).

In another embodiment, the background bio-medical knowledge graph is constructed from high-confidence results of stratification cohort analysis (identification of genomic, transcriptomic biomarkers, outcomes, ranked gene lists) performed on clinico-genomic data, e.g., TCGA, ICGC, GENIE, other external and internal cohorts.

In another embodiment, the proposed method uses continuous knowledge acquisition that includes: knowledge graph completion, which may include expanding the existing background knowledge graph, and new knowledge discovery (consisting of relation extraction and entity discovery).

In one embodiment, knowledge graph completion consists of or comprises embedding-based ranking, relation path reasoning, rule-based reasoning and meta relational learning. In another embodiment, entity discovery includes recognition, disambiguation, typing and alignment. In yet another embodiment, relation extraction utilizes models that incorporate attention mechanism, graph convolutional networks (GCNs), adversarial training, reinforcement learning, deep residual learning, and transfer learning.

Figure 4:
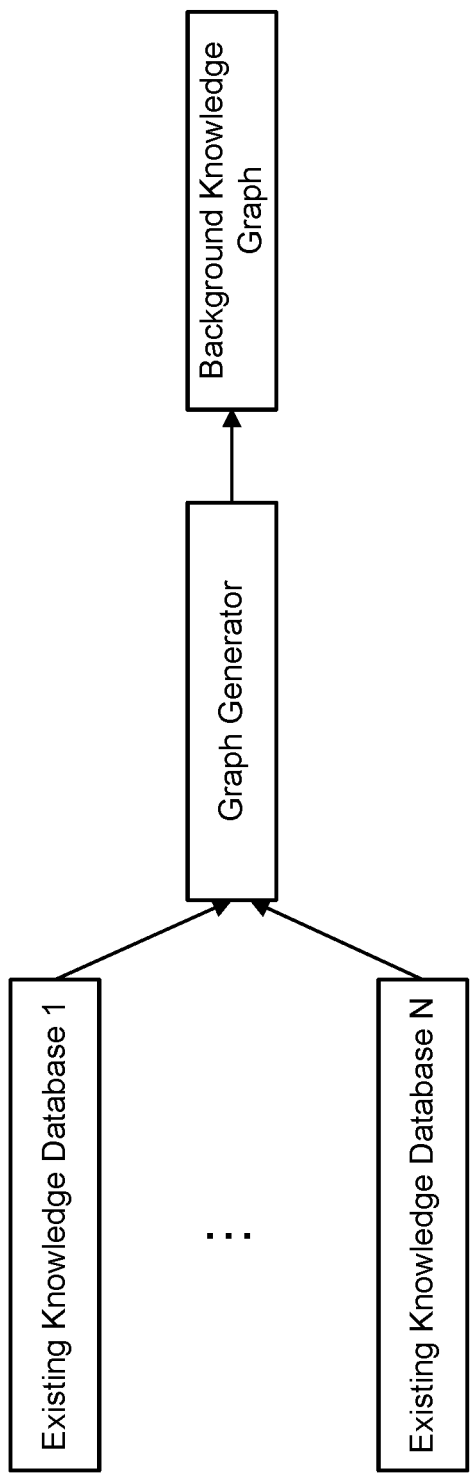
FIG. 4 is an illustration of an exemplary system for generating a background knowledge graph.

FIG. 4 illustrates an exemplary system for generating a background knowledge graph. In one embodiment, graph databases are used to manage domain knowledge. In another embodiment, an index pipeline ingests, updates, and processes data knowledge from existing knowledge bases and unifies it into a large-scale background knowledge graph(s).

III. Hypothesis Generation Module

Figure 5:
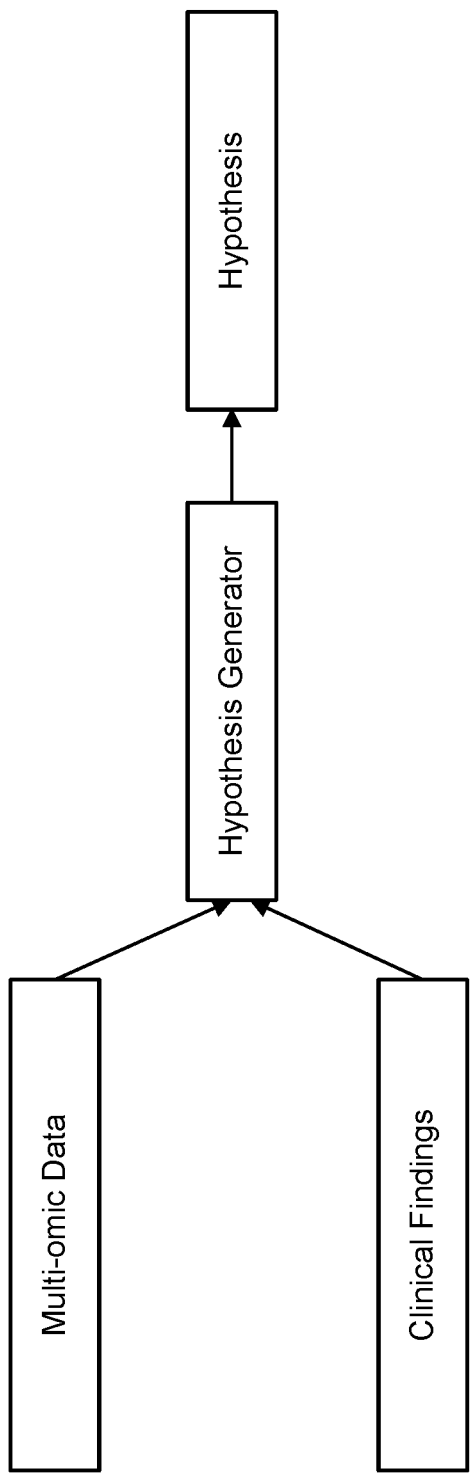
FIG. 5 is an illustration of an exemplary hypothesis generation engine.

FIG. 5 illustrated an exemplary hypothesis generation engine.

In some embodiments, the platforms, systems, media, and methods described herein include software/methods/system to generate a hypothesis that provides an association between multi-omic data and clinical findings generated following one or more of the following approaches described in the subsections below.

In some embodiments, hypothesis generation module provides interpretation for the proposed hypothesis, e.g., provides relevant information on strength of association (e.g., confidence score, the area under the Receiver Operating Characteristics for predicting outcome of interest); tissue specificity; interactome topology; integrative analysis; evidence from other modalities (e.g., immunological, metabolic, etc.).

In another example, hypothesis generation module lists other similar entities that share common genetic susceptibility (factors) and therefore can share therapies.

In another aspect, disclosed herein, a link prediction hypothesis generation task follows the following process: a) define topological features between source (e.g., biomarker, gene, drug) and target (e.g., cohort, disease, another drug, adverse event, etc.) nodes; b) calculate values for topological features for head-tail pairs (e.g., biomarker-cohort, gene-disease, drug-target); c) learn the importance of topology features in determining association status (e.g., summarize pathway score, evaluate closeness of embeddings); d) based on learned embedding vectors, which may be distributed representations for entities and relationships, attribute a confidence score for a new triplet/quadruple; and e) provide strength for an association of interest based on cohort stratification analysis, which may be a hypothesis rank.

3a. Hypothesis Generation on Knowledge Graphs

The platform, systems, media, and methods described herein, in some embodiments, utilize knowledge graph(s) or triple/quadruple store and link prediction for hypothesis generation. In one aspect, the disclosed system herein may utilize continuously updated "data" knowledge graph(s). In another aspect, the disclosed system herein may utilize continuously updated "what the world knows" background knowledge graph(s).

In one aspect, disclosed herein, the hypothesis generator module exploits graph-based analytics and features for, e.g., entity summaries, sub-graph summaries, dense sub-graph summaries (based on patient similarity networks that correlate with relevant outcomes: e.g., responders vs non-responders), paths finding and ranking, and sub-graph patterns to identify entities of high interest (e.g., via centrality, degree centrality, closeness centrality, average closeness to all nodes, betweenness centrality, counting incoming/outgoing connections, connecting subgroups, counting how often the node is on the shortest path, PageRank, personalized PageRank, transitive influence, triangle counting, strongly connected component detection, minimum spanning trees) and to predict possible connecting links between them, where the possible connecting links may involve a shortest path finding, and using label propagation, and random walks.

In yet another aspect, disclosed herein, the hypothesis generator module evaluates the knowledge graph's coverage (e.g., entity summary, relationship summarization, sub-graph summary) of a particular domain/topic (e.g., cohort, biomarker, relationship types that affect outcome) and/or groups of outliers presence (e.g., potential super-responders) to generate hypothesis triplet/quadruple.

In another aspect, disclosed herein, the hypothesis generator module performs entity-to-entity co-occurrence and cross-correlation, finds pathways between entities (e.g., relation path reasoning, neural multi-hop relational paths), or performs entity classification to discover where an unusually high degree of association might reside.

In another aspect, disclosed herein, the hypothesis generator module relies on knowledge graph representation learning (e.g., translation-based [e.g. TransE, TransH, TransR, TransD, TransG, TransX, KG2E, TranSparse, ManifoldE, CombinE, RotateE, TorusE, MURP], simple neural networks-based [NTN, ER-MLP, ProjE, ConvE], multiplication-based [e.g. RESCAL, DistMult, ComplEx, HolE, ANALOGY, DihEdral, TuckER, QuatE], path-based [e.g. PTransE, RTransE, TransE-COMP, DeepPath, TCE, MINERVA, MultiHopKG, RSN, OPTransE, RPJE, Node2Vec, DeepWalk, LINE, SDNE] and similar distributed representation learning methods [e.g. StarSpace, Node2Vec, Graph2Vec, DKRL]). That knowledge graph representation learning may be a generative approach to learn low-rank embeddings for knowledge entities and relations in order to score their possible associations in the context of knowledge graph completion, particularly link prediction. For any entity pair (head, tail)∈Entities×Entities and any relation relation E Relations, we can determine whether there is a fact (head, relation, tail) E Tails via their low-dimensional embeddings learned by Knowledge Graph Embedding models. These embeddings greatly facilitate understanding and mining knowledge in knowledge graphs, and allow to attribute numerical values for plausibility of generated hypotheses.

In yet another aspect, derived distributed graph representations are fine-tuned (using any of the machine learning methods for, e.g., Generative Adversarial Networks, Cycle Generative Adversarial Networks, Graph Neural Networks, Graph Transformer Networks) and validated using a set of known causal and spurious associations in the domain. In one non-limiting example, the graph representations can be trained and fine-tuned utilizing the databases (e.g., database of known biomarkers—NCCN biomarker compendium, GWAS catalogue, TCGA significantly mutated and actionable genes, clinical trials) in the time-dependent cross-validation fashion in order to prevent data leak.

In another aspect, the components of the knowledge graphs are stored in a graph database, triple store or similar system for storing triplets that can represent both entities and relations. In yet another aspect, the knowledge graph will also define a semantic data model: entities, relationships, properties. In additional aspect, extract transform and load data pipeline is defined to "triplify"/"quadruplify" the data and load it into a knowledge graph.

3b. Hypothesis Generation Using Graph Neural Networks

In one aspect, disclosed herein, the method apart from using knowledge graph embedding models, utilizes a more versatile and effective class of models based on Graph Neural Networks (GCNs) [e.g., GCN, GAT, GIN, R-GCN, R-GCN+, GraphSAGE, FastGCN, GraphSAINT, GCNII, SGAS, SIGN, GraphStar, Cluster-GCN, Deep Graph Infomax]. These methods treat the knowledge graph not only as a set of triplets/quadruplets but also as a graph, hence graph embedding models that capture topological features in a hierarchical manner.

In one embodiment, a Graph Neural Network (e.g., Spatial Graph Neural Network, Spectral graph Neural Network) is used to incorporate multi-level graph features, embed the data and to conduct link prediction or entity/relation classification to formulate a hypothesis. In this embodiment, Graph Neural Networks learn to predict labels from features and compute edge likelihood utilizing spatial graph convolutions, spectral graph convolutions, spatial-temporal graph neural networks, message-passing neural networks, node sampling (e.g., GraphSAGE, Graph Attention Networks [GAT]), layer-wise sampling (e.g., FastGCN), graph sampling (e.g., GraphSAINT), neural-based embeddings, graph attention models, and self-supervised learning.

One non-limiting example of edge likelihood computation consists of node embeddings using the underlying graph and message passing between neighboring nodes, deep neural networks to learn low-rank projections/embeddings for head, relationship and tail and direct computation of edge likelihood.

3c. Hypothesis Generation Using Semantic Search

In one aspect, hypothesis generation utilizes a fast cohort search engine for quick cohort stratification. This information retrieval and semantic search component allows fast acquiring and construction of cohorts for hypothesis generation and makes the integrated data searchable, helps to find relations and reduces the set of entities, relationships to a highly ranked set.

In another aspect, the semantic search provides ranked variants, genes, pathways, derived disease analytics, outputs of integrated machine learning models (e.g., cancer type classification, most likely site of recurrence, information about treatment outcomes for similar patients, outlier detection for sequencing quality) that are used in entity-to-entity traversal and generation of potential triples/quadruples hypothesis for, e.g., (biomarker, affects-end-point, cohort, [time-stamp]).

In another aspect, hypothesis generation utilizes semantic search indices that incorporate rule-based or learned clinical actionability for multi-omic data and relevant importance and size of phenotypic cohorts.

In one aspect, disclosed herein multi-modal search ranking methods provide a relevance-learning engine to integrate annotation sources, literature data, clinical trial outcomes and significantly mutated genes in well characterized cohorts to learn clinically actionable ranking for multi-omic data in order to initiate entity-to-entity traversal. In another aspect, the search is supporting querying individual samples, cohorts created on the fly, keywords, phrases, biomedical entities, relational facts, and taxonomic categories.

In one aspect, faceted semantic search on variants, genes, pathways, diseases, their embeddings, phenotypic variables uses Term-to-Term indexed that can, for example, be implemented using a combination of Document-to-Term Forward Index and Terms-to-Documents Inverted Index to traverse from entity to entity and identify highly ranked triples/quadruples guided by the knowledge graph topology and knowledge representation. In yet another aspect, search terms are expanded to a set of related terms, based on the documents where entities are found. In another aspect, multi-level traversals, for example, from gene to pathway, from drug to gene is enabled along with or instead of same level traversal from gene to gene for example. And both single-level traversal scoring and multi-level traversal scoring can be performed.

In another aspect, semantic search can generate entities dynamically during the hypothesis generation process since every edge between the nodes is a set intersection between the documents, so we can materialize nodes dynamically. For example, "colorectal cohort, immuno" query will traverse to other nodes, weigh and score these relationships and will return the ranked graph of entities (e.g., variants, genes, pathways; derived analytics, e.g., TMB, MSI; phenotypic associations, e.g., Karnofsky/ECOG score) annotated with similarities and/or edge weight/relevancy scoring and/or integration of multiple channels of evidence (overcoming the limitations of weak performance inherent to biomarkers supported by a single modality of data). This output can be further annotated using graph traversal methods.

In another aspect, the information retrieval module can also enable knowledge modeling and reasoning, anomaly detection, data cleansing, analytics, data classification, root cause analysis, and recommendation systems.

The search engine provides comprehensive assessment of single nucleotide variants, copy number variants, structural variants in both tumor and normal genomes, whole transcriptome, immune system, imaging, and clinical EHR for domain experts that do not code oncologists, cancer analysts, variant scientists, pathologists. Both on patient-specific and cohort-level can be used by Variant Scientists, Pathologists, Oncologists, Researchers and Physicians during virtual tumor boards to seed the generation of a hypothesis.

3d. Hypothesis Generation Using Multi-Modal Fusions Supervised/Semi-Supervised and Unsupervised Methods In another embodiment, multi-modal data hypothesis generation uses cohort stratification based on various fusion methods for multi-modal data, e.g., simple concatenation of different modalities (e.g. learning model-specific kernels that allow better fusion), computing multi-modal similarity, deep neural networks (e.g. RNNs/LSTMs) to learn multi-modal fusion components end-to-end, joint and coordinated representation (in order to enforce similarity between representations by minimizing the distance between modalities in the coordinated space, enforce additional constraints between modalities), co-learning, explicit or implicit alignment of modalities (e.g., Canonical Correlation Analysis), consensus maximization, translation (from one modality into another), sequential representation, multi-omic entity co-embedding to maximize disentanglement (orthogonal information), and early (features integrated immediately)/late (each modality derives independent features before fusion)/hybrid fusion schemes.

In a non-limiting example, the significance of learned features for separating cases and controls as applied to different endpoints of interest is used to formulate a hypothesis. Non-limiting examples of the multi-modal supervised/semi-supervised/unsupervised fusion methods are CCA, KCCA/TCCA/DCCA, DCCAE, MCCA, PLS, Manifold Alignment, Manifold Warping, Multiview, Spectral clustering, Variational Autoencoders, Beta-Variational Autoencoders.

3e. Hypothesis Generation—as a Knowledge Graph Completion on 'What is Known' Background Graph In one non-limiting example, hypothesis generation is formulated as a link prediction problem on the knowledge graph that represents 'what is known' in the domain.

In one aspect, this background knowledge graph captures disease state understanding by integrating real-world knowledge literature, clinical trials, patients, and from public and private multi-omic data sets to form a complete picture of disease biology, determining key regulatory events relevant to disease, e.g., pathway reconstruction, capturing causality and mechanisms discovered.

In another aspect, disclosed herein, the hypothesis generator module can use auxiliary information for knowledge graph representation, e.g., additional textual information (contextualized word embeddings, e.g., using transformer models [e.g., BERT, RoBERTa, BERT, ELECTRA, T5]) or additional semantic information from imaging embeddings to augment embedding of nodes for knowledge graph completion. In yet another aspect, disclosed herein, both structured knowledge and unstructured textual/imaging information are embedded in the same latent space.

In another aspect, entities in the background and data knowledge graphs are represented with hierarchical classes or types, and consequently, relations derive semantic types and hierarchical relation structure is maintained (e.g., variants map to protein domains, protein domains map to genes, genes map to pathways, pathways are mapped into disease states).

In another aspect, a hypothesis is generated via a three-step process: (a) entity alignment, a.k.a. entity matching or resolution that aims to find entities in different knowledge graphs (data knowledge graph and background knowledge graph) referring to the same real-world identity; (b) identifying relationships derived from data but not present in the background knowledge graph; (c) deriving likelihood of the link based on knowledge graph embeddings. A non-limiting example of the entity alignment includes identifying similar entities based on the symbolic and latent features, such as names, textual descriptions, attribute values, embeddings.

3f. Hypothesis Generation—Human in the Loop Approach

In another aspect, a hypothesis triplet is generated by utilizing human-in-the-loop. A human generates seeds—starting points to generate hypothesis triplets/quadruples, and the proposed method implements approaches to connect the selected seeds using Multi-Steiner trees, Pathway mining, other graph algorithms (e.g. PageRank, personal PageRank, TrustRank, closeness, centrality, degree centrality, betweenness centrality).

In yet another aspect, a human can manually-create features and patterns for hypothesis generation that are translated into queries on the knowledge graph, semantic search, clinic-genomic data.

In yet one other aspect, the hypothesis generation process can be primed by a human in the loop (e.g., the human can specify any combination of (head, relationship, tail, [timestamp])). The procedure described herein can use integrated databases, knowledge graph traversal, graph analytics, graph embeddings, semantic search to generate a list for the missing entities or relationships in the hypothesis and rank generated hypothesis. Based on what is provided by the domain expert, different ways of constructing hypothesis triplets/quadruplets are considered, for example, if a domain expert provides (head, tail). Hypothesis generator module will try to infer connections between entities based on relationships already found to exist between other entities in the network or will consider a potential pathway between two entities that predicts how one entity might affect another indirectly and derive the potential relationship. Inferring properties of an entity is based on similar entities utilizing learned knowledge graph representation.

In yet another aspect, the system can present automatically detected outliers or sub-groups in a dataset that follow different characteristics than the rest of the data (e.g., potential super responders), to prime human guided hypothesis generation.

In another aspect, the user can provide a list of full or partial hypotheses to score. A non-limiting list of examples that can be completed or scored by the hypothesis generation module includes:

1) Investigate if PD-L1 expression is associated with inferior response to EGFR-TKI in lung, which may be represented as (PD-L1-expression, drug-response-quantification, lung-cohort-with-EGFR-inhibitors-therapy)
2) Investigate if PD-L1 expression is associated with primary crizotnib resistance in all types of cancer, which may be represented as (PD-L1-expression, correlation, multi-cancer-cohort-with-crizotnib-resistance)
3) Investigate if TP53 and ALK+co-mutated non-small lung cancer responds to any drugs, which may be represented as (TP53+ALK, drug-response-quantification, NSCLC-cohort)
4) Investigate E2F cell cycle pathway score as a predictive biomarker of ER+/HER2− breast cancer response to neoadjuvant chemotherapy, which may be represented as (E2F-cell-cycle-pathway, response-to-neoadjuvant-chemotherapy, ER+/HER2-breast-cohort)
5) Investigate effect of ARID1A oncogenic loss of function mutations on overall survival in metastatic breast cancer patients, which may be represented as (ARID1A-lof, overall-survival-biomarker, metastatic-breast-cohort)

IV. Hypothesis Moderator

Figure 6:
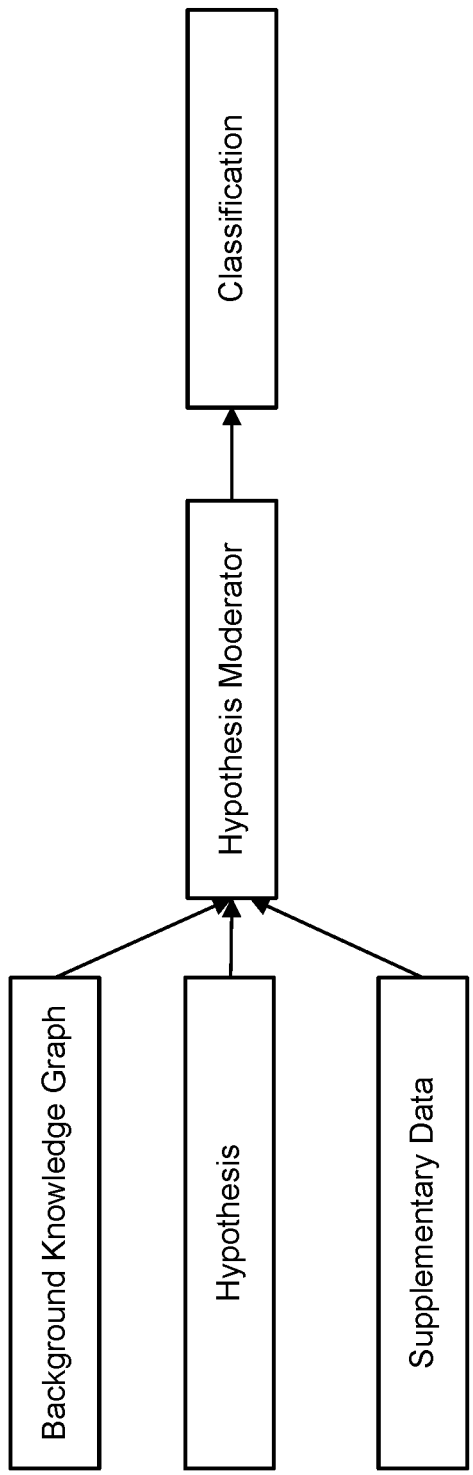
FIG. 6 is an illustration of an exemplary hypothesis moderator that ranks and filters hypotheses.

FIG. 6 illustrates an exemplary hypothesis moderator that ranks and filters hypotheses. In one embodiment, moderator module performs hypothesis filtering via triple classification on background knowledge graph: (a) known fact with a specific degree of evidence (e.g., if the triplet is present in the background knowledge graph); (b) unconfirmed knowledge or potential facts previously unknown that need validation (e.g., if the triplet not in the background knowledge graph but either based on knowledge graph embeddings, or pathway reasoning, or entities similarities, or multimodal evidence or other reasonable evidence it can be deduced that it can be a real finding); (c) spurious correlation and batch effect (e.g., known from the literature or from further data analysis); (d) false statements or statements that have contradictory evidence in the background knowledge graph; (e) trivial relation (e.g., human expert can classify it as such). In one non-limiting example, trivial relations are recognized by training a separate adversarial head to find a trivial hypothesis (head, relation, tail), and debias the knowledge graph embedding by projecting embedding to be orthogonal to learned trivial relations.

In another embodiment, a moderator performs hypothesis filtering via decision rule that is based on examining embedding-based ranking and the scoring function with a specific threshold. In a non-limiting example, the translational distance-based knowledge graph embedding method (e.g. TransE) has embeddings values for head plus relation roughly equal to embedding for tail entity up to a pre-specified threshold.

In yet another embodiment, a knowledge graph embedding method may explicitly model the uncertainty associated with relationships derived from the literature and uses link prediction on the background graph to further verify and rank hypotheses.

In one more embodiment, estimation of relationship quality is deduced from scientific literature, annotation sources, or collating multiple sources of evidence. In another embodiment, a mixture of experts is modeled by a series of orthogonal background knowledge graphs. In yet another embodiment, topology and metadata effects of background knowledge subgraph(s) are encoded and used to rank hypotheses. In another aspect, a joint learning framework with mutual attention for data fusion between knowledge graph(s) and possibly text is used. In yet another aspect, probabilistic graphical models and factor graphs are used to estimate the probability of each hypothesis, based on the observations from various sources.

In one other embodiment, hypotheses are verified using independent sources of evidence: clinical trials, external literature sources, protein interaction networks, deduced biological mechanisms, functional multi-omics data, structured hierarchical bio-medical data and other types of data indexed in background knowledge graph(s). In one non-limiting example, hypothesis moderator identifies plausible regulatory mechanisms from a background knowledge graph to explain the hypothesis and then rank and filter hypotheses based on the explanations generated.

In one non-limiting example, to reconcile multiple background knowledge graph(s), a multi-view or single-view knowledge graph embedding(s) may be used. In one non-limiting example, multiple view similarity is enforced by fusing different views in latent space to derive fused view encoding for ranking hypotheses. In another non-limiting example, hypotheses are ranked using evidence scoring based on embedding likelihoods, and a final confidence score is derived by merging independent ranks for different sources of evidence.

In another non-limiting example, locality sensitive hashing is used to combine embeddings with basic distances and to be able to compare hypotheses in a pairwise fashion.

In another aspect, the moderator ranks and filters hypotheses based on ability to replicate the finding in independent data set(s) (e.g. TCGA, ICGC, GENIE, or a separate internal data set).

In another aspect, the moderator tracks dynamic/temporal changes in the background knowledge graph(s) (e.g., efficacy of treatments, regulatory changes, consensus literature) to determine the ranking for the proposed hypothesis.

In one aspect, the hypothesis moderator performs relation path reasoning (e.g. the Path-Ranking Algorithm and other types of random walk inference) that models complex relation paths and breaks down support for a proposed hypothesis into a sequence of other relations. In this scenario, the moderator examines the relational path under a combination of path constraints and chooses hypotheses with relational path of highest support and performs, for example, maximum-likelihood classification.

In yet another aspect, the hypothesis moderator performs vector space similarity heuristics, neural multi-hop relational path modeling, methods for examining chain of reasoning, graph neural attention mechanisms, and deep reinforcement learning (e.g. DeepPath, MINERVA, Multi-Hop, M-Walk, CPL) to identify the likelihood of the path.

Figure 7:
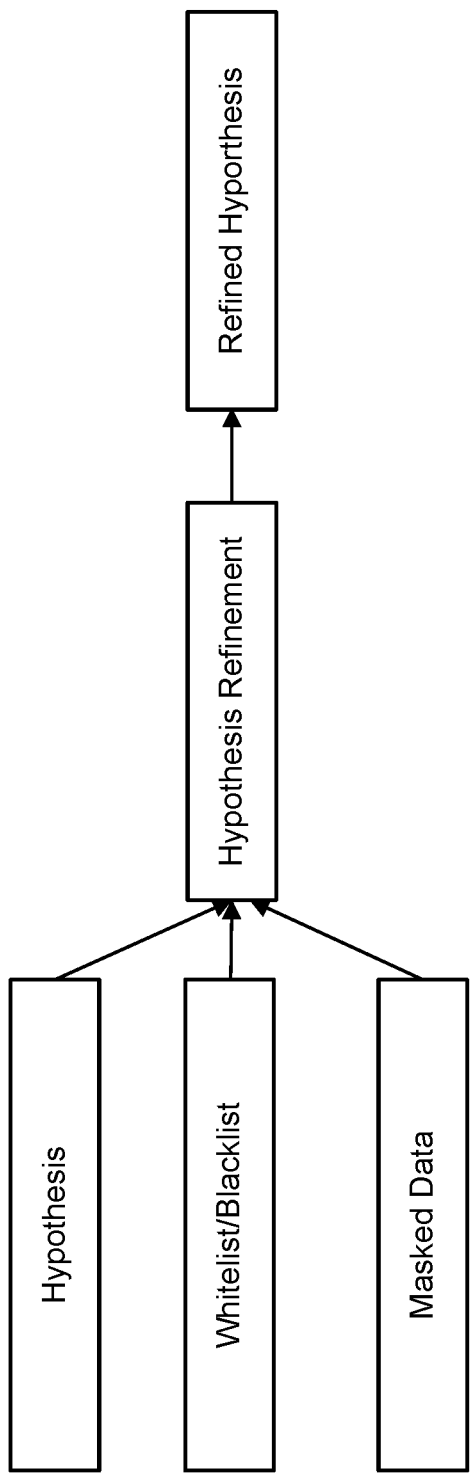
FIG. 7 is an illustration of an exemplary artificial intelligence engine for iterative hypothesis refinement.

In yet one other aspect, the moderator module ranks and filters hypotheses, and surfaces most promising hypotheses to the domain experts (e.g., physicians, oncologists, pathologists, radiologists, and researchers) for feedback. In this scenario, the expert may decide to mask certain entities and relations for future rounds of hypothesis generation and refinement. FIG. 7 illustrates an exemplary artificial intelligence engine for iterative hypothesis refinement.

Additional methods for reducing spurious correlations may include having a whitelist and/or blacklist of relationships. For example, any relationship which arises between certain categorizations may be blacklisted. For example, correlations between demographics may be blacklisted as factors which no patient has control over or correlations may not generate meaningful hypotheses such as "women live longer than men" which is represented as a correlation between gender and age at death, both of which may be categorized as demographic information. Certain relationships may be more frequently meaningful, such as correlations between genetic sequencing results and outcomes from treatments or procedures.

In another example, relations which derive from bias may be ignored. For example, a relation between institution and breast cancer may be inferred because an institution such as Northwestern University may have contributed patient data from one of their oncological research centers. Additionally, due to the institutional bias, there may be a correlation between patient location (locations which were services by the institution) and occurrence of breast cancer.

In another aspect, the stringency of the moderator's filtering role determines how unconstrained the hypothesis generator module is: the better the moderator at filtering and ranking hypotheses, the more unconstrained can the generator be at generating hypotheses. In one non-limiting example, the dynamics between hypothesis generator and moderator can be modeled using game theory, adversarial generative networks, and similar systems.

In another aspect, the system tracks all generated hypotheses above a certain evidence threshold in the database of hypotheses.

In one non-limiting example, an artificial intelligence engine for directed hypothesis generation and ranking described herein is trained in a temporal cross-validation fashion: we remove all links discovered past a certain time t and fine-tune embeddings and evaluate the system by predicting the removed links. In another non-limiting example, the system may be trained using random removal of a certain percentage of links. In one non limiting example, we evaluate what percentage of these relationships can be reconstructed based on knowledge graph representation embeddings in a link prediction setting.

In another non-limiting example, interpretability and explainability (e.g., ITransF that uses sparse vectors for knowledge transferring and interprets with attention visualization, CrossE method for embedding-based path searching, attention based explanation in GAT) is used to break hypothesis into verifiable sub-components, and align them with the background graph(s) of "what is known" for ranking for a particular hypothesis.

V. Iterative Refinement Module

In yet one other aspect, a continuous integration, inference and refinement module that iteratively refines and updates entities and relationships and their representations to yield a higher quality of hypothesis over time is implemented.

In one non-limiting example, the system for hypothesis generation and moderation is implemented as ontology alignment between the data knowledge graph for hypothesis generation and the background knowledge graph of "what is known". The system disclosed herein performs joint knowledge graph embedding learning and knowledge graph alignment using Generative Adversarial Network (GAN) which learns (a) to represent the relational knowledge from two distinct graph schemas in the form of knowledge embeddings and (b) to use them for ontology alignment, by using embeddings. The Generative Adversarial Network is trained using bootstrapping to iteratively improve the learned embeddings and alignments between data and background clinico-genomic data streams. In one aspect, two competing networks—a Generator and a discriminator—are pitted against one another in a zero-sum game. The hypothesis generator learns to map from a latent space to a data distribution of interest, while the discriminator learns to distinguish hypothesis candidates produced by the generator from the true data distribution of true facts.

Continuous inference is performed and verified facts are added into the knowledge base/knowledge graph.

The evaluation of the framework disclosed herein is performed on existing medical biomarkers 'gold standard' (e.g., NCCN biomarker compendium, ASCO and AACR abstracts, a set of high-quality publications, internal knowledge base of biomarker-related facts).

Iterative refinement with human in the loop: hypothesis can be further refined by the human expert in the loop. In another aspect, the system can use active learning to refine hypotheses. In another aspect, the iterative hypothesis refinement module allows to compute core similarity or score any list of entities provided by human experts against any other list of entities, relations, and induced subgraphs.

Main Method

FIG. 1 illustrates system 100 which may access one or more databases, such as the patient data store above. Additionally, system 100 may include one or more artificial intelligence engines such as an implementation of a machine learning algorithm or neural network as described above, which may be present to receive one or more features from the patient datastore.

In one example, an artificial intelligence engine may receive the entirety of the feature set across all patients to generate one or more respective correlation matrices. In another example, an artificial intelligence engine may receive specially selected subsets of the feature set across all patients to generate other one or more respective correlation matrices. Feature set selection, artificial intelligence engine selection, and generation of correlation matrices may be implemented according to any of the disclosure herein.

In another example, a preprocessing stage may evaluate the available features of the feature set and/or generated correlation matrices to identify new feature sets and artificial intelligence engines which should be applied to direct the correlation exploration rather than systematically examine all possible combinations of features for correlations with all possible other combinations of features. Directed correlation exploration may be implemented according to any of the disclosure herein.

A correlation matrix may reveal the predictive value of a first feature with any second feature of the feature set. The representation of the predictive value may be a percentage where 100% represents that the first feature always coincides with the second feature, 0% represents that the first feature never coincides with the second feature, and may be any percentage from 0-100% as calculated from a respective artificial intelligence engine.

Once one or more correlation matrices have been generated, a hypothesis generator may identify correlations from the matrices for further analysis. The selection process may include ranking the correlations and starting from the highest ranked correlation and stepping down through the ranking until a cutoff threshold is met. In another example, the selection process may include starting from the lowest ranked correlation and stepping upwards through the ranking until a second cutoff threshold is met. Cutoff thresholds may be a preselected percentage value or may be generated based off of the distribution of percentages across the matrices such that only the top and bottom 5%, 15%, 25%, etc., are sent to further analysis or only those values outside of one standard deviation from the median are selected. In one example, correlation matrices may be compared to one another to identify potential for exploration.

Correlations which have been selected for further analysis may be converted to a database query representation. In one example, a plurality of ontologies, vocabularies, dictionaries, code sets, or other such representations of ideas may be utilized. Features from the patient dataset may be mapped to one or more entities as they exist in an ontology. Once correlations are mapped to an entity, they may be reduced to the most representative concept available by reducing the concept set of the mapped entity to a standardized vocabulary, ontology, code set, or dictionary of terms. An example of an entity mapping engine is disclosed, for example, in U.S. Patent Application Publication No. 2020/0176098, titled "Clinical Concept Identification, Extraction, and Prediction System and Related Methods," and published Jun. 4, 2020, which is incorporated herein by reference and in its entirety for all purposes.

Mapping entities may result in imputed entities which represent the reduced concept or most representative concept to contextualize the query. Mapping entities may also lead to imputed relationships and logical operators which characterize the nature of the correlation. In some examples, correlations may not be mapped to a relationship, and therefore, may not be generated as a hypothesis. This may reduce spurious correlations and prevent undue hypothesis generation which may overwhelm the correlation exploration.

Correlations between one or more correlation matrices may be cross referenced to eliminate correlations which are results of biasing within the patient dataset.

The combination of imputed entities, mapped entities, imputed relationships, or mapped relationships may be combined to form a hypothesis query.

A hypothesis query, such as "(prostate treatment) {degarelix} AND {other factor} [leads to] {remission}" may be generated based off of one or more correlation matrices from the AI engine, above.

A moderation engine may receive each hypothesis query generated for filtering and ranking.

A filtering engine may filter queries via a blacklist or whitelist. A blacklist or whitelist may be curated by a user of the system or may be learned from AI detecting that users of the system always discard or review and approve relationships as spurious or potentially actionable.

Another filtering engine may filter queries based off of features of the query. For example, some features may be inherently interesting and worthy of further consideration so automatically passed through the filtering engine. In other embodiments, the relationships themselves may be automatically passed through the filtering engine or certain combinations of features and relationships are passed through.

Garbage collection of Queries

Filtering may include generating a list of queries for which a user may review. Filtering may include removing the query from the list of queries or adding the query to the list of queries.

Queries received from the hypothesis generator may be sent to the knowledge matching database to confirm whether the query hypothesis is known or unknown to any of the general public or general or specialized medical communities online.

A key part of the Moderator is that it is built on top of one or multiple knowledge databases. It needs to translate each incoming hypothesis into a query on the knowledge database. Existing relations in the knowledge database are used to filter the hypotheses into certain categories (e.g. trivial facts, known facts, novel findings), which can also be expressed as a ranking of all hypotheses.

A confidence score could be added to the ranking/classification based on the number and quality/source of the found existing relations.

As the hypothesis queries are passed through the filter and classified according to their usefulness to the user, they may be added to the list of queries and ranked. A rank may be increased for novel findings and decreased for trivial facts, known facts, or other spurious queries as identified by the filtering AI engine. In another example, ranking may be identified based upon an algorithm or machine learning classification.

The ranking could be iterative: after being provided with the initial ranking of hypotheses, the user can manually exclude certain variables, and the outputs can be refined upon that (e.g., hypotheses that are based on similar variables will be excluded as well).

In accordance with various embodiments, this disclosure also relates to a non-transitory computer-readable medium in which a program is stored for causing a computer to perform a method for directed hypothesis generation and ranking.

Data

In one aspect, sequencing of tumor normal pairs, or tumor only sample, e.g. for genomic (single nucleotide variations, indels in tumor and normal; structural rearrangements, copy number variations, gene fusions, and expressed variants for tumor genomes), transcriptomic (e.g. RNA-Seq variant confirmation and differential gene expression), epigenetic, proteomic abundance and localization, medical literature data (e.g. publications, treatment guidelines, clinical trials inclusion/exclusion criteria, patents), phenotypic data (e.g. functional, clinical, EHR), imaging data (e.g. histology, pathology, MRI), annotation sources (e.g. databases capturing clinical actionability of variants, genes, pathways, chemicals, drugs, lines of therapy), derived disease analytics (e.g. tumor mutation burden, mutational signatures, microsatellite instability status, RNA sequence confirmed variants, differentially expressed genes, spatial omics lineage representations, neo-antigen binding affinities for MHC class I and class II molecule, pathway enrichment analysis, features extracted from imaging, multi-modal genomic and clinical data), predictions from machine learning models and their features (e.g. primary site of origin, microsatellite instability, site of potential future metastasis, drug and trial matches) are abstracted into the knowledge graph schema relying on pre-specified ontologies and vocabularies.

In accordance with various embodiments, including the methods discussed or contemplated herein, the multi-omic genomic data can be selected from the group consisting of somatic or germline calls from whole genome sequence data, somatic or germline calls from whole exome sequence data, somatic or germline panel sequencing from fresh frozen tissue, somatic or germline panel sequencing from formalin-fixed paraffin-embedded tissue, somatic panel sequencing from liquid biopsy, tumor and normal variant calls, tumor/normal transcriptomic data indexed as variant confirmed in RNA or gene expression level, epigenetic data, proteomic data, single cell sequencing data, and combinations thereof.

As discussed above and as will be discussed in further detail below, the various methods (and systems) described and contemplated herein, in accordance with various embodiments, include derived phenotypes and secondary disease analytics. Secondary disease analytics allows to access important characteristics of the disease including, for example, tumor mutation burden, mutation signatures, spatial omics lineage representations, neo-antigen binding affinities for MHC class I and class II molecule, RNA sequence confirmed variants, differentially expressed genes, pathway enrichment analysis, microsatellite instability status and microsatellite repetitive loci, and features extracted from imaging and clinical data. In accordance with various embodiments, this data can be pre-computed for individual samples or dynamically computed for cohort samples. In accordance with various embodiments, disease analytics can be integrated into the knowledge graph. Machine learning classifications and outputs can also be indexed into the knowledge graph, for example, primary site of origin, prediction of future metastasis site, classifying variant as true or false positives, information about treatment outcomes for similar patients, outlier detection for sequencing quality, and disease state prediction for cohorts.

As discussed above and as will be discussed in further detail below, the various methods (and systems) described and contemplated herein, in accordance with various embodiments, further include a mechanism (e.g., as a step, feature, engine, module or software module) for integrating derived disease analytics from analysis on internal or external patient cohort (e.g., embedding multi-omic datasets, separately and together to regularize their respective latent space for DNA and RNA tumor alterations; embedding text data from EHR, clinical notes, literature, annotations; deep transformer models for named entity recognition and summarization of text and annotation data; embedding imaging data). The integration can function to provide neural models for advanced disease analytics (e.g., classification of a site of origin, prediction of the site of future metastasis, neoantigen binding prediction, classifying variants as true or false positive, drug and trial matching, recommender systems for treatment that use information from similar cases, and deep learning autoencoder methods for cohort analytics and stratification).

In accordance with various embodiments, including the methods discussed or contemplated herein, the heterogeneous knowledge graph can further comprise extracted phenotype data. The phenotype data can be selected from the group consisting of electronic health records, clinical data, functional data, curated data from medical records and combinations thereof.

In accordance with various embodiments, including the methods discussed or contemplated herein, the heterogeneous knowledge graph can further comprise featurized imaging data. The featurized imaging data can be selected from the group consisting of histology slides, MIII images, X-rays, mammograms, ultrasounds, PET images, CT scans, and combinations thereof.

Patient records exist in numerous formats ranging from physical papers sitting in folders on a shelf at a physician's office to electronic health/medical records to even structured formats residing in a database of patient information. The present systems and methods may rely on data extracted from one or more of these sources, as well as from large numbers of these records, regardless of source. For example, the systems and methods may ingest data from at least about 500 distinct records, or at least about 1,000 records, or at least about 5,000 records, or at least about 10,000 records. Certain records may be associated with a common patient or each record may be associated with a distinct patient. In either case, the data may relate to substantially the same number of patents, namely at least about 500 patients, or at least about 1,000 patients, or at least about 5,000 patients, or at least about 10,000 patients.

These patient records may be associated with multitudes of identified, structured components unique to the recording system that stores the data, for example, when the records are sourced from different healthcare providers or other institutions that use different electronic health or medical record software systems and/or different database solutions for storing the data used by those software systems. Searching these individual recording systems, including those that are mere physical storage solutions, requires substantial initial preparation to tie the information in each storage solution to a commonly referenceable structured format. Such structuring may result in the data being used by the disclosed systems and methods, regardless of the format in which that data was originally stored.

Once converted to the commonly referenceable structured format, the systems and methods may extract a multiplicity of data points or features in order to undertake additional analytical steps. While feature scope across all patients is informationally dense, a patient's feature set may be comparatively sparsely populated across the entirety of the collective feature scope of all features across all patients. For example, the feature scope across all patients may be at least about 1,000 features and likely may expand into the tens of thousands of features. At the same time, a patient's unique feature set may only include a subset of those features, although that subset still may number in the hundreds or thousands of the collective feature scope, for example, at least about 100 features, or at least about 500 features, or at least about 1,000 features, based upon the records available for that patient. Similarly, the present systems and methods may rely on a subset of the total number of possible features available all of the records, although that subset similarly may number in the hundreds or thousands of the collective feature scope, for example, at least about 100 features, or at least about 500 features, or at least about 1,000 features.

Of particular relevance to the present disclosure, one subset of features may comprise molecular data features, such as features derived from an RNA sequencing feature module or a DNA sequencing feature module. In some cases, features comprise whole exome sequencing data (WES), i.e., a sequence of the entire protein-coding portion of a patient's genome. The human exome comprises at least about 45 megabases. To collect sufficient sequencing data to accurately determine a patient's exome sequence, 100× sequencing coverage is often recommended. Accordingly, such whole exome sequence features comprise about 4, about 5, about 6, about 7, about 8, about 9, about 10, or more gigabytes of data. In other cases, features comprise whole genome sequencing (WGS), i.e., a sequence of each nucleotide of the patient's genome. The human genome comprises about 3.2 billion base pairs. To accurately determine a patient's WGS, 30× coverage is often recommended. Therefore, such features typically comprise about 100, about 120, about 140, about 160, or more gigabytes of data. In some cases, features comprise RNA sequencing (RNA-seq) data, which typically include mRNA sequences, but which may also include additional RNA species including, for example, miRNAs. Such features typically comprise at least about 20, about 40, about 60, about 80, or about 100 thousand reads, or about 20, about 40, about 60, about 80, or about 100 million reads to have adequate coverage of the transcriptome. Therefore, such features typically comprise about 2, about 4, about 6, about 8, about 10, or more gigabytes of data.

In addition to raw sequencing data, features may comprise sequence data that has been, or is to be "aligned" to the human genome, further increasing the complexity and the size of data, for example SAM and BAM files. In some cases, the raw sequencing data must be aligned to the genome or portions of the genome to be interpreted. Several informatic methods are known in the art to accomplish sequence alignment. Essentially, next generation sequencing (NGS) relies on sequencing large numbers of small polynucleotides, e.g., about 20-250 base pairs in length. However, to have appropriate context for the sequences, they must be aligned to an appropriate genome or transcriptome. This allows for identification of polymorphisms, mutations, quantification of gene expression, etc. The human genome is about 3.2 billion base pairs in length. Thus, it can be seen that aligning hundreds of millions of individual sequences to a reference genome of 3.2 billion base pairs is beyond the scope of what the human mind can reasonably accomplish. Accordingly, RNA and DNA sequencing features from at least about 500 patients, or at least about 1,000 patients, or at least about 5,000 patients, or at least about 10,000 patients, comprises a tremendous amount of complex data.

Given the large sizes of the input components, including two or more of the number of records being evaluated, the number of patients corresponding to those records, the number of different sources of data, the total number of possible features to evaluate from among all records, the number of features within the set of features being evaluated, and, when the features comprise genomic data, the numbers of whole exome sequencing, whole genome sequencing, or RNA sequencing, it can be seen that the complexity of the present systems and methods may quickly expand exponentially beyond the point by which human mental or manual activity may be able to implement those systems or carry out those methods. Thus, the present systems and methods also may implement an artificial engine applying one or more machine learning models (for example, Autoencoders, Variational Autoencoders, Sparse Vector Analysis, Principal Component Analysis, Independent Component Analysis, Tensor Factorization), neural networks (including, for example, autoencoders, variational autoencoders, deep belief networks, restricted Boltzman machines and generative adversarial networks), regression techniques, graphing techniques, inductive reasoning approaches, or other artificial intelligence evaluations to identify the records to analyze, normalize those records, identify the features to be analyzed, generate values for one or more of those features, analyzing those features or the interrelationships between features or one or more features and one or more other variables, and/or implement one or more steps of those methods. As a result, the present systems and methods may generate real-world, practical, and/or clinically actionable results for providers, patients, researchers, clinical trial administrators, and/or other users, as described in greater detail herein.

As discussed above and as will be discussed in further detail below, the various methods (and systems) described and contemplated herein, in accordance with various embodiments, include a patient feature set that may involve a comprehensive feature set of features which may be extracted from patient records. A patient data store may be a pre-existing dataset that includes features of patient clinical history which has been abstracted from the patient records. Features of patient clinical history may include features having broad categorization such as demographics, comorbidities, diagnosis and recurrences, medications, surgeries, and other treatments along with their response and adverse effects details. The patient data store may also include patient genetic/molecular sequencing and genetic mutation details relating to the patient, as well as organoid modeling results. In one aspect, these datasets may be generated from one or more sources. For example, institutions implementing the system may be able to draw from all of their records; for example, all records from all doctors and/or patients connected with the institution may be available to the institutions agents, physicians, research, or other authorized members. Similarly, doctors may be able to draw from all of their records; for example, records for all of their patients. Alternatively, certain system users may be able to buy or license aspects of the datasets, such as when those users do not have immediate access to a sufficiently robust dataset, when those users are looking for even more records, and/or when those users are looking for specific data types, such as data reflecting patients having a particular disease state, certain primary cancers, metastases by origin site and/or diagnosis site, recurrences by origin, or metastases.

A patient data store may include one or more feature modules which may comprise a collection of features available for every patient in the system. These features may be used to generate and model the artificial intelligence classifiers in the system. While feature scope across all patients is informationally dense, a patient's feature set may be sparsely populated across the entirety of the collective feature scope of all features across all patients. For example, the feature scope across all patients may expand into the tens of thousands of features while a patient's unique feature set may only include a subset of hundreds or thousands of the collective feature scope based upon the records available for that patient.

Feature collections may include a diverse set of fields available within patient health records. Clinical information may be based upon fields which have been entered into an electronic medical record (EMR) or an electronic health record (EHR) by a physician, nurse, or other medical professional or representative. Other clinical information may be curated from other sources, such as molecular fields from genetic sequencing reports. Sequencing may include next-generation sequencing (NGS) and may be long-read, short-read, or other forms of sequencing a patient's somatic and/or normal genome. A comprehensive collection of features in additional feature modules may combine a variety of features together across varying fields of medicine which may include diagnoses, responses to treatment regimens, genetic profiles, clinical and phenotypic characteristics, and/or other medical, geographic, demographic, clinical, molecular, or genetic features. For example, a subset of features may comprise molecular data features, such as features derived from an RNA feature module or a DNA feature module sequencing.

Another subset of features, imaging features from imaging feature module, may comprise features identified through review of a specimen through pathologist review, such as a review of stained H&E or IHC slides.

As another example, a subset of features may comprise derivative features obtained from the analysis of the individual and combined results of such feature sets. Features derived from DNA and RNA sequencing may include genetic variants from variant science module which are present in the sequenced tissue. Further analysis of the genetic variants may include additional steps such as identifying single or multiple nucleotide polymorphisms, identifying whether a variation is an insertion or deletion event, identifying loss or gain of function, identifying fusions, calculating copy number variation, calculating microsatellite instability, calculating tumor mutational burden, or other structural variations within the DNA and RNA. Analysis of slides for H&E staining or IHC staining may reveal features such as tumor infiltration, programmed death-ligand 1 (PD-L1) status, human leukocyte antigen (HLA) status, or other immunology features.

Features derived from structured, curated, or electronic medical or health records may include clinical features such as diagnosis, symptoms, therapies, outcomes, patient demographics such as patient name, date of birth, gender, ethnicity, date of death, address, smoking status, diagnosis dates for cancer, illness, disease, diabetes, depression, other physical or mental maladies, personal medical history, family medical history, clinical diagnoses such as date of initial diagnosis, date of metastatic diagnosis, cancer staging, tumor characterization, tissue of origin, treatments and outcomes such as line of therapy, therapy groups, clinical trials, medications prescribed or taken, surgeries, radiotherapy, imaging, adverse effects, associated outcomes, genetic testing and laboratory information such as performance scores, lab tests, pathology results, prognostic indicators, date of genetic testing, testing provider used, testing method used, such as genetic sequencing method or gene panel, gene results, such as included genes, variants, expression levels/statuses, or corresponding dates to any of the above.

Features may be derived from information from additional medical or research-based Omics fields including proteome, transcriptome, epigenome, metabolome, microbiome, and other multi-omic fields. Features derived from an organoid modeling lab may include the DNA and RNA sequencing information germane to each organoid and results from treatments applied to those organoids. Features derived from imaging data may further include reports associated with a stained slide, size of tumor, tumor size differentials over time including treatments during the period of change, as well as machine learning approaches for classifying PDL1 status, HLA status, or other characteristics from imaging data. Other features may include the additional derivative features sets from other machine learning approaches based at least in part on combinations of any new features and/or those listed above. For example, imaging results may need to be combined with MSI calculations derived from RNA expressions to determine additional further imaging features. In another example a machine learning model may generate a likelihood that a patient's cancer will metastasize to a particular organ or a patient's future probability of metastasis to yet another organ in the body. Other features that may be extracted from medical information may also be used. There are many thousands of features, and the above listing of types of features are merely representative and should not be construed as a complete listing of features.

An alteration module may be one or more microservices, servers, scripts, or other executable algorithms which generate alteration features associated with de-identified patient features from the feature collection. Alterations modules may retrieve inputs from the feature collection and may provide alterations for storage. Exemplary alterations modules may include one or more of the following alterations as a collection of alteration modules.

An SNP (single-nucleotide polymorphism) module may identify a substitution of a single nucleotide that occurs at a specific position in the genome, where each variation is present to some appreciable degree within a population (e.g. >1%). For example, at a specific base position, or loci, in the human genome, the C nucleotide may appear in most individuals, but in a minority of individuals, the position is occupied by an A. This means that there is a SNP at this specific position and the two possible nucleotide variations, C or A, are said to be alleles for this position. SNPs underline differences in our susceptibility to a wide range of diseases (e.g.—sickle-cell anemia, β-thalassemia and cystic fibrosis result from SNPs). The severity of illness and the way the body responds to treatments are also manifestations of genetic variations. For example, a single-base mutation in the APOE (apolipoprotein E) gene is associated with a lower risk for Alzheimer's disease.

A single-nucleotide variant (SNV) is a variation in a single nucleotide without any limitations of frequency and may arise in somatic cells. A somatic single-nucleotide variation (e.g., caused by cancer) may also be called a single-nucleotide alteration.

An MNP (Multiple-nucleotide polymorphisms) module may identify the substitution of consecutive nucleotides at a specific position in the genome.

An InDels module may identify an insertion or deletion of bases in the genome of an organism classified among small genetic variations. While usually measuring from 1 to 10,000 base pairs in length, a microindel is defined as an indel that results in a net change of 1 to 50 nucleotides. Indels can be contrasted with a SNP or point mutation. An indel inserts and deletes nucleotides from a sequence, while a point mutation is a form of substitution that replaces one of the nucleotides without changing the overall number in the DNA. Indels, being either insertions, or deletions, can be used as genetic markers in natural populations, especially in phylogenetic studies. Indel frequency tends to be markedly lower than that of single nucleotide polymorphisms (SNP), except near highly repetitive regions, including homopolymers and microsatellites.

An MSI (microsatellite instability) module may identify genetic hypermutability (predisposition to mutation) that results from impaired DNA mismatch repair (MMR). The presence of MSI represents phenotypic evidence that MMR is not functioning normally. MMR corrects errors that spontaneously occur during DNA replication, such as single base mismatches or short insertions and deletions. The proteins involved in MMR correct polymerase errors by forming a complex that binds to the mismatched section of DNA, excises the error, and inserts the correct sequence in its place. Cells with abnormally functioning MMR are unable to correct errors that occur during DNA replication and consequently accumulate errors. This causes the creation of novel microsatellite fragments. Polymerase chain reaction-based assays can reveal these novel microsatellites and provide evidence for the presence of MSI. Microsatellites are repeated sequences of DNA. These sequences can be made of repeating units of one to six base pairs in length. Although the length of these microsatellites is highly variable from person to person and contributes to the individual DNA "fingerprint", each individual has microsatellites of a set length. The most common microsatellite in humans is a dinucleotide repeat of the nucleotides C and A, which occurs tens of thousands of times across the genome. Microsatellites are also known as simple sequence repeats (SSRs).

A TMB (tumor mutational burden) module may identify a measurement of mutations carried by tumor cells and is a predictive biomarker being studied to evaluate its association with response to Immuno-Oncology (I-O) therapy. Tumor cells with high TMB may have more neoantigens, with an associated increase in cancer-fighting T cells in the tumor microenvironment and periphery. These neoantigens can be recognized by T cells, inciting an anti-tumor response. TMB has emerged more recently as a quantitative marker that can help predict potential responses to immunotherapies across different cancers, including melanoma, lung cancer and bladder cancer. TMB is defined as the total number of mutations per coding area of a tumor genome. Importantly, TMB is consistently reproducible. It provides a quantitative measure that can be used to better inform treatment decisions, such as selection of targeted or immunotherapies or enrollment in clinical trials.

A CNV (copy number variation) module may identify deviations from the normal genome and any subsequent implications from analyzing genes, variants, alleles, or sequences of nucleotides. CNV are the phenomenon in which structural variations may occur in sections of nucleotides, or base pairs, that include repetitions, deletions, or inversions.

A Fusions module may identify hybrid genes formed from two previously separate genes. It can occur as a result of: translocation, interstitial deletion, or chromosomal inversion. Gene fusion plays an important role in tumorigenesis. Fusion genes can contribute to tumor formation because fusion genes can produce much more active abnormal protein than non-fusion genes. Often, fusion genes are oncogenes that cause cancer; these include BCR-ABL, TEL-AML1 (ALL with t(12; 21)), AML1-ETO (M2 AML with t(8; 21)), and TMPRSS2-ERG with an interstitial deletion on chromosome 21, often occurring in prostate cancer. In the case of TMPRSS2-ERG, by disrupting androgen receptor (AR) signaling and inhibiting AR expression by oncogenic ETS transcription factor, the fusion product regulates prostate cancer. Most fusion genes are found from hematological cancers, sarcomas, and prostate cancer. BCAM-AKT2 is a fusion gene that is specific and unique to high-grade serous ovarian cancer. Oncogenic fusion genes may lead to a gene product with a new or different function from the two fusion partners. Alternatively, a proto-oncogene is fused to a strong promoter, and thereby the oncogenic function is set to function by an upregulation caused by the strong promoter of the upstream fusion partner. The latter is common in lymphomas, where oncogenes are juxtaposed to the promoters of the immunoglobulin genes. Oncogenic fusion transcripts may also be caused by trans-splicing or read-through events. Since chromosomal translocations play such a significant role in neoplasia, a specialized database of chromosomal aberrations and gene fusions in cancer has been created. This database is called Mitelman Database of Chromosome Aberrations and Gene Fusions in Cancer.

An IHC (Immunohistochemistry) module may identify antigens (proteins) in cells of a tissue section by exploiting the principle of antibodies binding specifically to antigens in biological tissues. IHC staining is widely used in the diagnosis of abnormal cells such as those found in cancerous tumors. Specific molecular markers are characteristic of particular cellular events such as proliferation or cell death (apoptosis). IHC is also widely used in basic research to understand the distribution and localization of biomarkers and differentially expressed proteins in different parts of a biological tissue. Visualizing an antibody-antigen interaction can be accomplished in a number of ways. In the most common instance, an antibody is conjugated to an enzyme, such as peroxidase, that can catalyze a color-producing reaction in immunoperoxidase staining. Alternatively, the antibody can also be tagged to a fluorophore, such as fluorescein or rhodamine in immunofluorescence. Approximations from RNA expression data, H&E slide imaging data, or other data may be generated.

A Therapies module may identify differences in cancer cells (or other cells near them) that help them grow and thrive and drugs that "target" these differences. Treatment with these drugs is called targeted therapy. For example, many targeted drugs go after the cancer cells' inner 'programming' that makes them different from normal, healthy cells, while leaving most healthy cells alone. Targeted drugs may block or turn off chemical signals that tell the cancer cell to grow and divide; change proteins within the cancer cells so the cells die; stop making new blood vessels to feed the cancer cells; trigger your immune system to kill the cancer cells; or carry toxins to the cancer cells to kill them, but not normal cells. Some targeted drugs are more "targeted" than others. Some might target only a single change in cancer cells, while others can affect several different changes. Others boost the way your body fights the cancer cells. This can affect where these drugs work and what side effects they cause. Matching targeted therapies may include identifying the therapy targets in the patients and satisfying any other inclusion or exclusion criteria.

A VUS (variant of unknown significance) module may identify variants which are called but cannot be classified as pathogenic or benign at the time of calling. VUS may be cataloged from publications regarding a VUS to identify if they may be classified as benign or pathogenic.

A Trial module may identify and test hypotheses for treating cancers having specific characteristics by matching features of a patient to clinical trials. These trials have inclusion and exclusion criteria that must be matched to enroll which may be ingested and structured from publications, trial reports, or other documentation.

An Amplifications module may identify genes which increase in count disproportionately to other genes. Amplifications may cause a gene having the increased count to go dormant, become overactive, or operate in another unexpected fashion. Amplifications may be detected at a gene level, variant level, RNA transcript or expression level, or even a protein level. Detections may be performed across all the different detection mechanisms or levels and validated against one another.

An Isoforms module may identify alternative splicing (AS), the biological process in which more than one mRNA (isoforms) is generated from the transcript of a same gene through different combinations of exons and introns. It is estimated by large-scale genomics studies that 30-60% of mammalian genes are alternatively spliced. The possible patterns of alternative splicing for a gene can be very complicated and the complexity increases rapidly as number of introns in a gene increases. In silico alternative splicing prediction may find large insertions or deletions within a set of mRNA sharing a large portion of aligned sequences by identifying genomic loci through searches of mRNA sequences against genomic sequences, extracting sequences for genomic loci and extending the sequences at both ends up to 20 kb, searching the genomic sequences (repeat sequences have been masked), extracting splicing pairs (two boundaries of alignment gap with GT-AG consensus or with more than two expressed sequence tags aligned at both ends of the gap), assembling splicing pairs according to their coordinates, determining gene boundaries (splicing pair predictions are generated to this point), generating predicted gene structures by aligning mRNA sequences to genomic templates, and comparing splicing pair predictions and gene structure predictions to find alternative spliced isoforms.

A Pathways module may identify defects in DNA repair pathways which enable cancer cells to accumulate genomic alterations that contribute to their aggressive phenotype. Cancerous tumors rely on residual DNA repair capacities to survive the damage induced by genotoxic stress which leads to isolated DNA repair pathways being inactivated in cancer cells. DNA repair pathways are generally thought of as mutually exclusive mechanistic units handling different types of lesions in distinct cell cycle phases. Recent preclinical studies, however, provide strong evidence that multifunctional DNA repair hubs, which are involved in multiple conventional DNA repair pathways, are frequently altered in cancer. Identifying pathways which may be affected may lead to important patient treatment considerations.

A Raw Counts module may identify a count of the variants that are detected from the sequencing data. For DNA, this may be the number of reads from sequencing which correspond to a particular variant in a gene. For RNA, this may be the gene expression counts or the transcriptome counts from sequencing.

Structural variant classification may include evaluating features from the feature collection, alterations from the alteration module, and other classifications from within itself from one or more classification modules. Structural variant classification may provide classifications to a stored classifications storage. An exemplary classification module may include a classification of a CNV as "Reportable" may mean that the CNV has been identified in one or more reference databases as influencing the tumor cancer characterization, disease state, or pharmacogenomics, "Not Reportable" may mean that the CNV has not been identified as such, and "Conflicting Evidence" may mean that the CNV has both evidence suggesting "Reportable" and "Not Reportable." Furthermore, a classification of therapeutic relevance is similarly ascertained from any reference dataset's mention of a therapy which may be impacted by the detection (or non-detection) of the CNV. Other classifications may include applications of machine learning algorithms, neural networks, regression techniques, graphing techniques, inductive reasoning approaches, or other artificial intelligence evaluations within modules. A classifier for clinical trials may include evaluation of variants identified from the alteration module which have been identified as significant or reportable, evaluation of all clinical trials available to identify inclusion and exclusion criteria, mapping the patient's variants and other information to the inclusion and exclusion criteria, and classifying clinical trials as applicable to the patient or as not applicable to the patient. Similar classifications may be performed for therapies, loss-of-function, gain-of-function, diagnosis, microsatellite instability, tumor mutational burden, indels, SNP, MNP, fusions, and other alterations which may be classified based upon the results of the alteration modules.

Each of the feature collection, alteration module(s), structural variant and feature store may be communicatively coupled to a data bus to transfer data between each module for processing and/or storage. In another embodiment, each of the feature collection, alteration module(s), structural variant and feature store may be communicatively coupled to each other for independent communication without sharing the data bus.

In addition to the above features and enumerated modules. Feature modules may further include one or more of the following modules within their respective modules as a sub-module or as a standalone module.

Germline/somatic DNA feature module may comprise a feature collection associated with the DNA-derived information of a patient or a patient's tumor. These features may include raw sequencing results, such as those stored in FASTQ, BAM, VCF, or other sequencing file types known in the art; genes; mutations; variant calls; and variant characterizations. Genomic information from a patient's normal sample may be stored as germline and genomic information from a patient's tumor sample may be stored as somatic.

An RNA feature module may comprise a feature collection associated with the RNA-derived information of a patient, such as transcriptome information. These features may include raw sequencing results, transcriptome expressions, genes, mutations, variant calls, and variant characterizations.

A metadata module may comprise a feature collection associated with the human genome, protein structures and their effects, such as changes in energy stability based on a protein structure.

A clinical module may comprise a feature collection associated with information derived from clinical records of a patient and records from family members of the patient. These may be abstracted from unstructured clinical documents, EMR, EHR, or other sources of patient history. Information may include patient symptoms, diagnosis, treatments, medications, therapies, hospice, responses to treatments, laboratory testing results, medical history, geographic locations of each, demographics, or other features of the patient which may be found in the patient's medical record. Information about treatments, medications, therapies, and the like may be ingested as a recommendation or prescription and/or as a confirmation that such treatments, medications, therapies, and the like were administered or taken.

An imaging module may comprise a feature collection associated with information derived from imaging records of a patient. Imaging records may include H&E slides, IHC slides, radiology images, and other medical imaging which may be ordered by a physician during the course of diagnosis and treatment of various illnesses and diseases. These features may include TMB, ploidy, purity, nuclear-cytoplasmic ratio, large nuclei, cell state alterations, biological pathway activations, hormone receptor alterations, immune cell infiltration, immune biomarkers of MMR, MSI, PDL1, CD3, FOXP3, HRD, PTEN, PIK3CA; collagen or stroma composition, appearance, density, or characteristics; tumor budding, size, aggressiveness, metastasis, immune state, chromatin morphology; and other characteristics of cells, tissues, or tumors for prognostic predictions.

An epigenome module, such as epigenome module from Omics, may comprise a feature collection associated with information derived from DNA modifications which are not changes to the DNA sequence and regulate the gene expression. These modifications are frequently the result of environmental factors based on what the patient may breathe, eat, or drink. These features may include DNA methylation, histone modification, or other factors which deactivate a gene or cause alterations to gene function without altering the sequence of nucleotides in the gene.

A microbiome module, such as microbiome module from Omics, may comprise a feature collection associated with information derived from the viruses and bacteria of a patient. These features may include viral infections which may affect treatment and diagnosis of certain illnesses as well as the bacteria present in the patient's gastrointestinal tract which may affect the efficacy of medicines ingested by the patient.

A proteome module, such as proteome module from Omics, may comprise a feature collection associated with information derived from the proteins produced in the patient. These features may include protein composition, structure, and activity; when and where proteins are expressed; rates of protein production, degradation, and steady-state abundance; how proteins are modified, for example, post-translational modifications such as phosphorylation; the movement of proteins between subcellular compartments; the involvement of proteins in metabolic pathways; how proteins interact with one another; or modifications to the protein after translation from the RNA such as phosphorylation, ubiquitination, methylation, acetylation, glycosylation, oxidation, or nitrosylation.

Additional Omics module(s) may also be included in Omics, such as a feature collection associated with all the different field of omics, including: cognitive genomics, a collection of features comprising the study of the changes in cognitive processes associated with genetic profiles; comparative genomics, a collection of features comprising the study of the relationship of genome structure and function across different biological species or strains; functional genomics, a collection of features comprising the study of gene and protein functions and interactions including transcriptomics; interactomics, a collection of features comprising the study relating to large-scale analyses of gene-gene, protein-protein, or protein-ligand interactions; metagenomics, a collection of features comprising the study of metagenomes such as genetic material recovered directly from environmental samples; neurogenomics, a collection of features comprising the study of genetic influences on the development and function of the nervous system; pangenomics, a collection of features comprising the study of the entire collection of gene families found within a given species; personal genomics, a collection of features comprising the study of genomics concerned with the sequencing and analysis of the genome of an individual such that once the genotypes are known, the individual's genotype can be compared with the published literature to determine likelihood of trait expression and disease risk to enhance personalized medicine suggestions; epigenomics, a collection of features comprising the study of supporting the structure of genome, including protein and RNA binders, alternative DNA structures, and chemical modifications on DNA; nucleomics, a collection of features comprising the study of the complete set of genomic components which form the cell nucleus as a complex, dynamic biological system; lipidomics, a collection of features comprising the study of cellular lipids, including the modifications made to any particular set of lipids produced by a patient; proteomics, a collection of features comprising the study of proteins, including the modifications made to any particular set of proteins produced by a patient; immunoproteomics, a collection of features comprising the study of large sets of proteins involved in the immune response; nutriproteomics, a collection of features comprising the study of identifying molecular targets of nutritive and non-nutritive components of the diet including the use of proteomics mass spectrometry data for protein expression studies; proteogenomics, a collection of features comprising the study of biological research at the intersection of proteomics and genomics including data which identifies gene annotations; structural genomics, a collection of features comprising the study of 3-dimensional structure of every protein encoded by a given genome using a combination of modeling approaches; glycomics, a collection of features comprising the study of sugars and carbohydrates and their effects in the patient; foodomics, a collection of features comprising the study of the intersection between the food and nutrition domains through the application and integration of technologies to improve consumer's well-being, health, and knowledge; transcriptomics, a collection of features comprising the study of RNA molecules, including mRNA, rRNA, tRNA, and other non-coding RNA, produced in cells; metabolomics, a collection of features comprising the study of chemical processes involving metabolites, or unique chemical fingerprints that specific cellular processes leave behind, and their small-molecule metabolite profiles; metabonomics, a collection of features comprising the study of the quantitative measurement of the dynamic multiparametric metabolic response of cells to pathophysiological stimuli or genetic modification; nutrigenetics, a collection of features comprising the study of genetic variations on the interaction between diet and health with implications to susceptible subgroups; cognitive genomics, a collection of features comprising the study of the changes in cognitive processes associated with genetic profiles; pharmacogenomics, a collection of features comprising the study of the effect of the sum of variations within the human genome on drugs; pharmacomicrobiomics, a collection of features comprising the study of the effect of variations within the human microbiome on drugs; toxicogenomics, a collection of features comprising the study of gene and protein activity within particular cell or tissue of an organism in response to toxic substances; mitointeractome, a collection of features comprising the study of the process by which the mitochondria proteins interact; psychogenomics, a collection of features comprising the study of the process of applying the powerful tools of genomics and proteomics to achieve a better understanding of the biological substrates of normal behavior and of diseases of the brain that manifest themselves as behavioral abnormalities, including applying psychogenomics to the study of drug addiction to develop more effective treatments for these disorders as well as objective diagnostic tools, preventive measures, and cures; stem cell genomics, a collection of features comprising the study of stem cell biology to establish stem cells as a model system for understanding human biology and disease states; connectomics, a collection of features comprising the study of the neural connections in the brain; microbiomics, a collection of features comprising the study of the genomes of the communities of microorganisms that live in the digestive tract; cellomics, a collection of features comprising the study of the quantitative cell analysis and study using bioimaging methods and bioinformatics; tomomics, a collection of features comprising the study of tomography and omics methods to understand tissue or cell biochemistry at high spatial resolution from imaging mass spectrometry data; ethomics, a collection of features comprising the study of high-throughput machine measurement of patient behavior; and videomics, a collection of features comprising the study of a video analysis paradigm inspired by genomics principles, where a continuous image sequence, or video, can be interpreted as the capture of a single image evolving through time of mutations revealing patient insights.

A sufficiently robust collection of features may include all of the features disclosed above; however, models and predictions based from the available features may include models which are optimized and trained from a selection of features that are much more limiting than the exhaustive feature set. Such a constrained feature set may include as few as tens to hundreds of features. For example, a model's constrained feature set may include the genomic results of a sequencing of the patient's tumor, derivative features based upon the genomic results, the patient's tumor origin, the patient's age at diagnosis, the patient's gender and race, and symptoms that the patient brought to their physicians attention during a routine checkup.

A feature store may enhance a patient's feature set through the application of machine learning and analytics by selecting from any features, alterations, or calculated output derived from the patient's features or alterations to those features. Such a feature store may generate new features from the original features found in the feature module or may identify and store important insights or analysis based upon the features. The selections of features may be based upon an alteration or calculation to be generated, and may include the calculation of single or multiple nucleotide polymorphisms insertion or deletions of the genome, a tumor mutational burden, a microsatellite instability, a copy number variation, a fusion, or other such calculations. An exemplary output of an alteration or calculation generated which may inform future alterations or calculations includes a finding of hypertrophic cardiomyopathy (HCM) and variants in MYH7. Wherein previous classified variants may be identified in the patient's genome which may inform the classification of novel variants or indicate a further risk of disease. An exemplary approach may include the enrichment of variants and their respective classifications to identify a region in MYH7 that is associated with HCM. Any novel variants detected from a patient's sequencing localized to this region would increase the patient's risk for HCM. Features which may be utilized in such an alteration detection include the structure of MYH7 and classification of variants therein. A model which focuses on enrichment may isolate such variants.

Features in the patient data store may be aggregated from many different sources, each source potentially having their own organizational and identification schema for structuring the features within the source. One embodiment of the instant invention may convert all incoming features to a common, structured format of the patient data store. Similarly, clinical trial information may be aggregated from many different sources, each potentially having their own organizational and identification schema for structuring the clinical trial information within the source. One embodiment of the instant invention may also convert all incoming clinical trial information to the common, structured format of the patient data store as well as an intermediate concept mapping to preserve inclusion and exclusion criteria in the original clinical trial information.

Additional websites may be crawled to obtain semantic uses of language as well as develop ontologies for mapping specific terms to their general concepts. Websites including Wikipedia.org, Dictionary.com, WebMD.com, MayoClinic.org, and other knowledge, ontology, or institution specific knowledge resources may be crawled and curated to power a knowledge matching database. An example of a mapping engine is disclosed, for example, in U.S. Patent Application Publication No. 2020/0176098, titled "Clinical Concept Identification, Extraction, and Prediction System and Related Methods," and published Jun. 4, 2020, which is incorporated herein by reference and in its entirety for all purposes. Another example of an entity mapping engine is disclosed, for example, in U.S. Patent Application Publication No. 2020/0381087, titled "Systems and Methods of Clinical Trial Evaluation," and published Dec. 3, 2020, which is incorporated herein by reference and in its entirety for all purposes.

'What is Known' Background Knowledge Graph or Knowledgebase

As discussed above and as will be discussed in further detail below, the various methods (and systems) described and contemplated herein, in accordance with various embodiments, further include a mechanism (e.g., as a step, feature, engine, module or software module) for integrating multiple annotation and literature sources. These sources can include, for example, FDA labels, NCCN guidelines, CIViC, DoCM, OncoKB, Mycancergenome, GDKB, TCGA, ICGC, COSMIC, NCI60, CCLE, Drugbank, ClinVar, HGMD, PGMD, PharmGKB, dbSNP, dbNSFP, 1000Genomes, EXAC, CPDB, KEGG, BioCarta, BioCyc, Reactome, GenMAPP, MSigDB, Brenda, CTD, HPRD, GXD, BIND, PubMed, popular pre-print servers (arXiv, bioRxiv, medRxiv, ChemRxiv) full body or abstract only articles, clinical trials, and relevant patient subset. In various embodiments, annotations and ranking can propagate from higher level of representation to the lower levels (e.g., for pathway to gene to variant, or from gene to variant codon to a full variant specification—chromosome, position, reference, alternative).

In accordance with various embodiments, the system disclosed herein, may encompass two or more separate knowledge graph classes: one class of graphs is constructed in order to conduct continuous inferences from the available datasets (both internal and external) and another set of background knowledge graphs to capture what is known in the domain (e.g. knowledge graph constructed from real world data, literature sources, clinical trials, patents, and various structured annotation sources).

In another aspect, the (biomarker, relation, cohort) training data is derived from analysis of the cohort data, or is derived from external annotation sources (e.g. FDA labels, NCCN guidelines, NCCN Drug and Biologics Compendium, CIViC, OncoKB, etc.) and literature (e.g. MEDLINE, PubMed, clinical trials, patents).

In accordance with various embodiments, the methods discussed or contemplated herein can further comprise ranking the selected one or more hypothesis generated by the system. The ranking can comprise a clinical ranking. The ranking can comprise stratifying a cohort by incorporating a latent space representation for cancer data. The cohort can be stratified into responders and non-responders. The cohort can be stratified into long-progression free survival time and short-progression free survival time. The latent space representation can be performed by a neural network. The neural network can be selected from the group consisting of autoencoders, variational autoencoders, deep belief networks, restricted Boltzman machines and generative adversarial networks.

In accordance with various embodiments, ranking for potential biomarkers in a cohort of samples can be accomplished by first learning the latent space representation of the multi-omic data streams (e.g., DNA and RNA and others as discussed herein), and then clustering representations and identifying a set of features (e.g., biomarkers) responsible for the largest disentanglement between sub-cohorts of interest. In accordance with various embodiments, a multi-omic unsupervised deep-learning approach (e.g., variational autoencoder) can be constructed for that purpose. In accordance with various embodiments, a deep generative adversarial network can be constructed, utilizing cyclic loss between multiple data streams. These approaches advantageously can increase power for detection of multi-omic biomarkers.

In accordance with various embodiments, a background knowledge base/graph to validate hypothesis queries may need a store of facts from which to validate queries. In one example, a comprehensive research, publication, and medical or clinical knowledge data store may combine a variety of features together across varying reference resources available to physicians, institutions, and patients. For example, the FDA requires clinical trials to register before they may enroll patients and be held. These registered clinical trials may be referenced using a website, such as clinicaltrials.gov, which contains a complete listing of all clinical trials registered with the FDA. In addition to clinicaltrials.gov, other government-sponsored websites and private websites may exist for searching through clinical trials. A web crawler may periodically crawl these websites collecting detailed information for clinical trials and add the collected clinical trial information to an internally curated clinical trial data storage. Clinical trials may also publish research papers identifying the clinical trial's purpose as well as any clinical trial information. Other medical journals may also publish findings from medical/health hospitals or other institutions, pharmacological studies, or other publications for medical purposes. As new publications are published, they may be curated and the health or medical information therein added to a respective database of the patient data storage. Curation may be performed by a medical professional, by a well-trained machine learning model, or a combination of both. Pharmaceutical companies or other institutions may maintain their own publicly available medical databases which may be queried to retrieve published knowledge and other information. A periodic query may be sent to collect these sources of information and add it to the respective patient data store. Each website, publication source, or database may be treated as an independent source of information. These independent sources may be compared to one another for accuracy as a whole or aggregated across each collection medium (website, publication, database, protocols), where discrepancies between sources may be evaluated by a medical professional and/or deference given to the most respected source (as a whole or in each collection medium). Information may be routinely gathered via any of the collection mediums to identify new knowledge from the clinical and medical communities. In some instances, a publication may include a new clinical trial, which may be added to the clinical trial data storage and any modifications may be updated to be reflected in the clinical trial data storage. A clinical trial data storage may include detailed clinical trial information having inclusion and exclusion criteria corresponding to any of the features stored in the comprehensive patient data store. Additional clinical trial information may include the study type (interventional/observational), study results, recruitment stage (not yet recruiting, recruiting, enrollment by invitation, suspended, unknown), title, planned measurement such as one described in the protocol that is used to determine the effect of an intervention/treatment on participants, interventions including drugs, medical devices, procedures, vaccines, and other products that are either investigational or already available, interventions including noninvasive approaches of education or modifying diet and exercise, sponsors or funders, geographic location (country, state, city, facility), trial stage such as those based on definitions developed by the FDA for the study's objective, the number of participants, and other characteristics (Early Phase 1, Phase 1, Phase 2, Phase 3, and Phase 4), or notable dates such as start and end dates. As each of these criteria are curated from their respective sources, a unified, internally-curated, and structured database may be formed to hold the criteria in the appropriate format.

In one aspect, the system may build a patient-centric graph mapping molecular data from cancer patients with one or more feature-annotation pairs. The system may search a cohort of patients for one or more signaling pathways with respect to a feature, where the signaling pathways may include progression free survival (PFS) up or PFS down or adverse reactions (higher or lower incidence), and where the features may include genes, therapies, treatments, or drugs. The system may exclude signaling pathways having a matching entity from the patient-centric graph. The system may aggregate patients into a cohort who may satisfy a relationship between an annotation and a signaling pathway, e.g., is pathway X good for patient Y, is pathway X of patient cohort A related to pathway Y of patient cohort B, and also may determine if associations of cohort A are correlated to cohort B. With regard to this analysis, some pathways may be single hops, e.g., pathway N is correlated with pathway M in cohort O. Alternatively, some signaling pathways may take multiple hops, e.g., pathway X is good for cohort A, cohort A has a high incidence of feature Z, and cohort B has a high incidence of feature Z, thus, the system may determine that pathway X is good for cohort B. Additionally, the system may include ranking the remaining pathways for meaningfulness and structuring and outputting the ranked signaling pathways as entries to a patient-centric graph as a feature/annotation pair.

Disclosed is an artificial intelligence engine for directed hypothesis generation and ranking. The method can comprise a plurality of heterogeneous knowledge graphs integrating multi-omic data (genomic, transcriptomic, molecular, imaging, clinical, electronic health records), wherein each of the plurality of multi-omic data triplets or quadruplets (if timestamp is modeled) comprises disease-specific data specific to a patient or a cohort of patients. The method can further comprise a knowledge graph representation of 'what the world knows' in the relevant bio-medical subspace (e.g. literature, clinical trials, real world evidence, patents, external molecular datasets human data, cell lines, and model organisms). The method can further comprise a hypothesis generation module that utilizes any of the following: knowledge graphs, semantic search, machine learning methods or graph methods for multi-modal data analysis, or domain expert in the loop. The method can further comprise semantic search analysis component that acts as a universal relation finder and allows fast acquiring and construction of cohorts by integrating multi-omic data indices (e.g., indexed tumor and normal genomes, transcriptomes, proteomes, epigenomes, derived cancer analytics [e.g., tumor mutation burden, mutational signatures, microsatellite instability status, pathway enrichment, neo-antigen identification, significantly mutated tumor drivers, immune signatures, tumor purity and heterogeneity, disease states and their derived embeddings], extracted phenotypes (e.g. EHR, clinical data, functional data, pathology reports, radiology reports), annotation sources, medical literature, imaging data (e.g. pathology slides, MRI) or a combination thereof), aggregating, summarizing, visualizing and returning ranked multi-omic alterations in terms of clinical actionability, degree of surprise (e.g. anomaly detection and identification of super-responders) for individual samples and cohorts. The method can further comprise a moderator module that ranks and filters hypotheses, prioritizing hypothesis that are novel, and possess clinical relevance over those that are spurious or known to the scientific or medical communities; most promising hypothesis can be presented to the domain experts (e.g. physicians, oncologists, pathologists, radiologists and researchers) for feedback. The method can further comprise a continuous integration module that iteratively refines and updates entities and relationships and their representations to yield higher quality of hypothesis generation over time.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the present disclosure as defined by the following appended claims.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this present disclosure.

What is claimed is:

1. A method, comprising:
providing a person-centric data storage including biomarker data entities specific to a person and comprising whole transcriptome-derived RNA data, the person-centric data storage also including one or more of clinical findings, disease state diagnostic data, or imaging-derived data, the person-centric data storage further including additional biomarker data and annotations associated with the additional biomarker data, the additional biomarker data related to one or more entities or relations in the person-centric data storage;
determining relationships between biomarker entities and outcomes events within the person-centric data storage;
referencing relationships between biomarker entities and outcomes events within a background knowledge data storage generated from a plurality of structured annotation data sources comprising two or more of scientific literature, guidelines, domain-specific knowledge bases, clinico-genomic data sets, or large-scale EHR data sets, the background knowledge data storage storing the biomarker entities and the outcomes events, as well as the respective relationships between the biomarker entities and the outcomes events;
generating ranked candidate relationships of observational significance between biomarker entities and outcomes events within the person-centric data storage, the generating comprising;
attributing a confidence score to each of the generated candidate relationships, the attributing step comprising, in part, translating the generated candidate relationships into queries against the referenced relationships within the background knowledge data storage and inputting the queries into an artificial intelligence engine configured to determine the confidence scores; and ranking the generated candidate relationships based on the attributed confidence scores to classify the generated ranked candidate relationships according to predictive accuracy and clinical actionability, wherein the ranking includes decreasing a rank for the generated ranked candidate relationships that match referenced relationships in the background knowledge data storage and increasing a rank for the generated ranked candidate relationships reflecting previously unknown relationships; and returning one or more of the ranked candidate relationships to a user.

2. The method of claim 1, wherein the person-centric data storage is a knowledge graph.

3. The method of claim 1, wherein the person-centric data storage is a database.

4. The method of claim 3, wherein the database is a graph database.

5. The method of claim 3, wherein the database is a relational database.

6. The method of claim 1, wherein the background knowledge data storage is a knowledge graph.

7. The method of claim 1, wherein the background knowledge data storage is a database.

8. The method of claim 1, wherein the ranked candidate relationships are generated using link prediction on the person-centric knowledge graph.

9. The method of claim 1, wherein the ranked candidate relationships are generated using graph neural networks.

10. The method of claim 1, wherein the ranked candidate relationships are generated using a semantic search.

11. The method of claim 1, wherein the ranked candidate relationships are generated using multi-modal fusions methods.

12. The method of claim 1, wherein the ranked candidate relationships are generated using link prediction on the background knowledge graph.

13. The method of claim 1, wherein the ranking further comprises reducing a rank for generated ranked candidate relationships corresponding to one or more of spurious correlations, false statements or statements that have contradictory evidence in the background knowledge data storage, or trivial relationships.

14. The method of claim 1, wherein the biomarker entities comprise tumor characteristics selected from the group consisting of quality control, tumor mutation burden, genomic mutation signatures, microsatellite instability status, neo-antigens, HLA-allele typing, RNA confirmed variants, copy number variants, structural variants, non-coding regulatory variants, gene fusions, pathway enrichment, cancer driver identification, mutation summary, differential gene expression, immune e signatures, and combinations thereof.

15. The method of claim 1, wherein the imaging-derived data comprises pathology findings, radiology findings, or histogenomic findings.

16. The method of claim 1, wherein determining relationships between biomarker entities and outcomes events comprises determining a temporal relational dependency between the biomarker entities and outcomes events.

17. The method of claim 1, further comprising evaluating the generated ranked candidate relationships relative to a threshold, wherein the ranking and returning steps are only applied to generated candidate relationships exceeding the threshold.

18. The method of claim 1, further comprising:
receiving a user selection of one or more ranked candidate relationships; and
identifying one or more therapies or lines of therapy associated with the biomarker events and outcomes events of the selected one or more ranked candidate relationships; and
presenting the identified therapies or lines of therapy to the user.

19. The method of claim 1, further comprising: receiving a user selection of one or more generated ranked candidate relationships; and identifying one or more clinical trials associated with the biomarker events and outcomes events of the selected one or more generated ranked candidate relationships; and presenting the identified clinical trials to the user.

20. The method of claim 1, further comprising: receiving a user selection of one or more generated ranked candidate relationships; and identifying one or more diagnostic tests associated with the biomarker events and outcomes events of the selected one or more ranked candidate relationships; and presenting the identified diagnostic tests to the user.

21. The method of claim 20, wherein the diagnostic tests include biomarker staining of pathology slides.

22. The method of claim 1, further comprising: receiving a user selection of one or more generated ranked candidate relationships; and identifying one or more person cohorts associated with the biomarker events and outcomes events of the selected one or more generated ranked candidate relationships; and presenting the identified cohorts to the user.

23. The method of claim 22, wherein the one or more person cohorts are outlier cohorts.

24. The method of claim 1, further comprising: receiving a user selection of one or more generated ranked candidate relationships; and identifying one or more sequencing assays associated with the biomarker events and outcomes events of the selected one or more generated ranked candidate relationships; and presenting the identified sequencing assays to the user.

25. The method of claim 24, wherein the one or more sequencing assays include a next generation sequencing assay.

26. The method of claim 1, further comprising: receiving a user selection of one or more generated ranked candidate relationships; and identifying one or more open care gaps for the person associated with the biomarker events and outcomes events of the selected one or more generated ranked candidate relationships; and presenting the identified open care gaps to the user.

27. The method of claim 1, further comprising: receiving a user selection of one or more generated ranked candidate relationships; and identifying one or more cellular pathway dysregulations associated with the biomarker events and outcomes events of the selected one or more generated ranked candidate relationships; and presenting the identified cellular pathway dysregulations to the user.

28. The method of claim 1, further comprising: periodically updating the relationships between biomarker entities and outcomes events within the background knowledge data storage.

29. A system for reducing computational burden in the identification of unknown and clinically relevant relationships between biomarker data and therapeutic outcomes, the system comprising:
- a computer including a processing device, the processing device configured to:
  - provide a person-centric data storage including biomarker data entities specific to a person and comprising whole transcriptome-derived RNA data, the person-centric data storage also including one or more of clinical findings, disease state diagnostic data, or imaging-derived data, the person-centric data storage further including additional biomarker data and annotations associated with the additional biomarker data, the additional biomarker data related to one or more entities or relations in the person-centric data storage;
  - determine relationships between biomarker entities and outcomes events within the person-centric data storage;
  - reference relationships between biomarker entities and outcomes events within a background knowledge data storage generated from a plurality of structured annotation data sources comprising two or more of scientific literature, guidelines, domain-specific knowledge bases, clinico-genomic data sets, or large-scale EHR data sets, the background knowledge data storage storing the biomarker entities and the outcomes events, as well as the respective relationships between the biomarker entities and the outcomes events;
  - generate ranked candidate relationships of observational significance between biomarker entities and outcomes events within the person-centric data storage, comprising;
    - attributing a confidence score to each of the generated ranked candidate relationships, the attributing step comprising, in part, translating the generated ranked candidate relationships into queries against the reference relationships within the background knowledge data storage and inputting the queries into an artificial intelligence engine configured to determine the confidence scores; and
    - ranking the generated ranked candidate relationships based on the attributed confidence scores to classify the generated ranked candidate relationships according to predictive accuracy and clinical actionability, wherein the ranking includes decreasing a rank for the generated ranked candidate relationships that match referenced relationships in the background knowledge data storage and increasing a rank for the generated ranked candidate relationships reflecting previously unknown relationships; and
  - return the ranked one or more candidate relationships to a user.

30. A non-transitory computer readable medium for reducing computational burden in the identification of unknown and clinically relevant relationships between biomarker data and therapeutic outcomes, comprising instructions for causing a computer to:
- provide a person-centric data storage including biomarker data entities specific to a person and comprising whole transcriptome-derived RNA data, the person-centric data storage also including one or more of clinical findings, disease state diagnostic data, or imaging-derived data, the person-centric data storage further including additional biomarker data and annotations associated with the additional biomarker data, the additional biomarker data related to one or more entities or relations in the person-centric data storage;
- determine relationships between biomarker entities and outcomes events within the person-centric data storage;
- reference relationships between biomarker entities and outcomes events within a background knowledge data storage generated from a plurality of structured annotation data sources comprising two or more of scientific literature, guidelines, domain-specific knowledge bases, clinico-genomic data sets, or large-scale EHR data sets, the background knowledge data storage storing the biomarker entities and the outcomes events, as well as the respective relationships between the biomarker entities and the outcomes events;
- generate ranked candidate relationships of observational significance between biomarker entities and outcomes events within the person-centric data storage, the generating comprising;
  - attributing a confidence score to each of the generated ranked candidate relationships, the attributing step comprising, in part, translating the generated ranked candidate relationships into queries against the referenced relationships within the background knowledge data storage and inputting the queries into an artificial intelligence engine configured to determine the confidence scores;
  - ranking the generated ranked candidate relationships based on the attributed confidence scores to classify the generated ranked candidate relationships according to predictive accuracy and clinical actionability, wherein the ranking includes decreasing a rank for the generated ranked candidate relationships that match referenced relationships in the background data storage and increasing a rank for the generated ranked candidate relationships reflecting previously unknown relationships; and
- return the ranked one or more candidate relationships to a user.

* * * * *